(12) United States Patent
Yunusov et al.

(10) Patent No.: US 12,278,718 B2
(45) Date of Patent: Apr. 15, 2025

(54) USER EQUIPMENT TIME DOMAIN EQUALIZATION CAPABILITY REPORTING

(71) Applicant: QUALCOMM Incorporated, San Diego, CA (US)

(72) Inventors: David Yunusov, Holon (IL); Idan Michael Horn, Hod Hasharon (IL); Valeri Sokolovski, Holon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 18/465,399

(22) Filed: Sep. 12, 2023

(65) Prior Publication Data

US 2025/0088393 A1   Mar. 13, 2025

(51) Int. Cl.
*H04L 25/03* (2006.01)
*H04L 25/02* (2006.01)

(52) U.S. Cl.
CPC .... *H04L 25/03006* (2013.01); *H04L 25/0204* (2013.01); *H04L 2025/03433* (2013.01)

(58) Field of Classification Search
CPC ........... H04L 25/03006; H04L 25/0204; H04L 2025/03433
See application file for complete search history.

(56) References Cited

U.S. PATENT DOCUMENTS

2010/0091822 A1\* 4/2010 Cookman ......... H04L 25/03159
375/232
2013/0022090 A1\* 1/2013 Weng ................... H04L 27/2607
375/260

\* cited by examiner

*Primary Examiner* — Sung S Ahn
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network node, a supported channel latency indication that indicates a supported channel latency for time domain equalization by the UE. The UE may receive, from the network node, a downlink communication based at least in part on the supported channel latency indication. Numerous other aspects are described.

30 Claims, 11 Drawing Sheets

USER EQUIPMENT TIME DOMAIN EQUALIZATION CAPABILITY REPORTING

FIELD OF THE DISCLOSURE

Aspects of the present disclosure generally relate to wireless communication and to techniques and apparatuses for user equipment (UE) time domain equalization capability reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include one or more memories and one or more processors coupled to the one or more memories. The one or more processors may be configured, individually or in any combination, to transmit, to a network node, a supported channel latency indication that indicates a supported channel latency for time domain equalization by the UE. The one or more processors may be configured, individually or in any combination, to receive, from the network node, a downlink communication based at least in part on the supported channel latency indication.

Some aspects described herein relate to a network node for wireless communication. The network node may include one or more memories and one or more processors coupled to the one or more memories. The one or more processors may be configured, individually or in any combination, to receive, from a UE, a supported channel latency indication that indicates a supported channel latency for time domain equalization by the UE. The one or more processors may be configured, individually or in any combination, to transmit, to the UE, a downlink communication based at least in part on the supported channel latency indication.

Some aspects described herein relate to a method of wireless communication performed by a UE. The method may include transmitting, to a network node, a supported channel latency indication that indicates a supported channel latency for time domain equalization by the UE. The method may include receiving, from the network node, a downlink communication based at least in part on the supported channel latency indication.

Some aspects described herein relate to a method of wireless communication performed by a network node. The method may include receiving, from a UE, a supported channel latency indication that indicates a supported channel latency for time domain equalization by the UE. The method may include transmitting, to the UE, a downlink communication based at least in part on the supported channel latency indication.

Some aspects described herein relate to a non-transitory computer-readable medium that stores a set of instructions for wireless communication by a UE. The set of instructions, when executed by one or more processors of the UE, may cause the UE to transmit, to a network node, a supported channel latency indication that indicates a supported channel latency for time domain equalization by the UE. The set of instructions, when executed by one or more processors of the UE, may cause the UE to receive, from the network node, a downlink communication based at least in part on the supported channel latency indication.

Some aspects described herein relate to a non-transitory computer-readable medium that stores a set of instructions for wireless communication by a network node. The set of instructions, when executed by one or more processors of the network node, may cause the network node to receive, from a UE, a supported channel latency indication that indicates a supported channel latency for time domain equalization by the UE. The set of instructions, when executed by one or more processors of the network node, may cause the network node to transmit, to the UE, a downlink communication based at least in part on the supported channel latency indication.

Some aspects described herein relate to an apparatus for wireless communication. The apparatus may include means for transmitting, to a network node, a supported channel latency indication that indicates a supported channel latency for time domain equalization by the apparatus. The apparatus may include means for receiving, from the network node, a downlink communication based at least in part on the supported channel latency indication.

Some aspects described herein relate to an apparatus for wireless communication. The apparatus may include means for receiving, from a UE, a supported channel latency indication that indicates a supported channel latency for time domain equalization by the UE. The apparatus may include means for transmitting, to the UE, a downlink communication based at least in part on the supported channel latency indication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
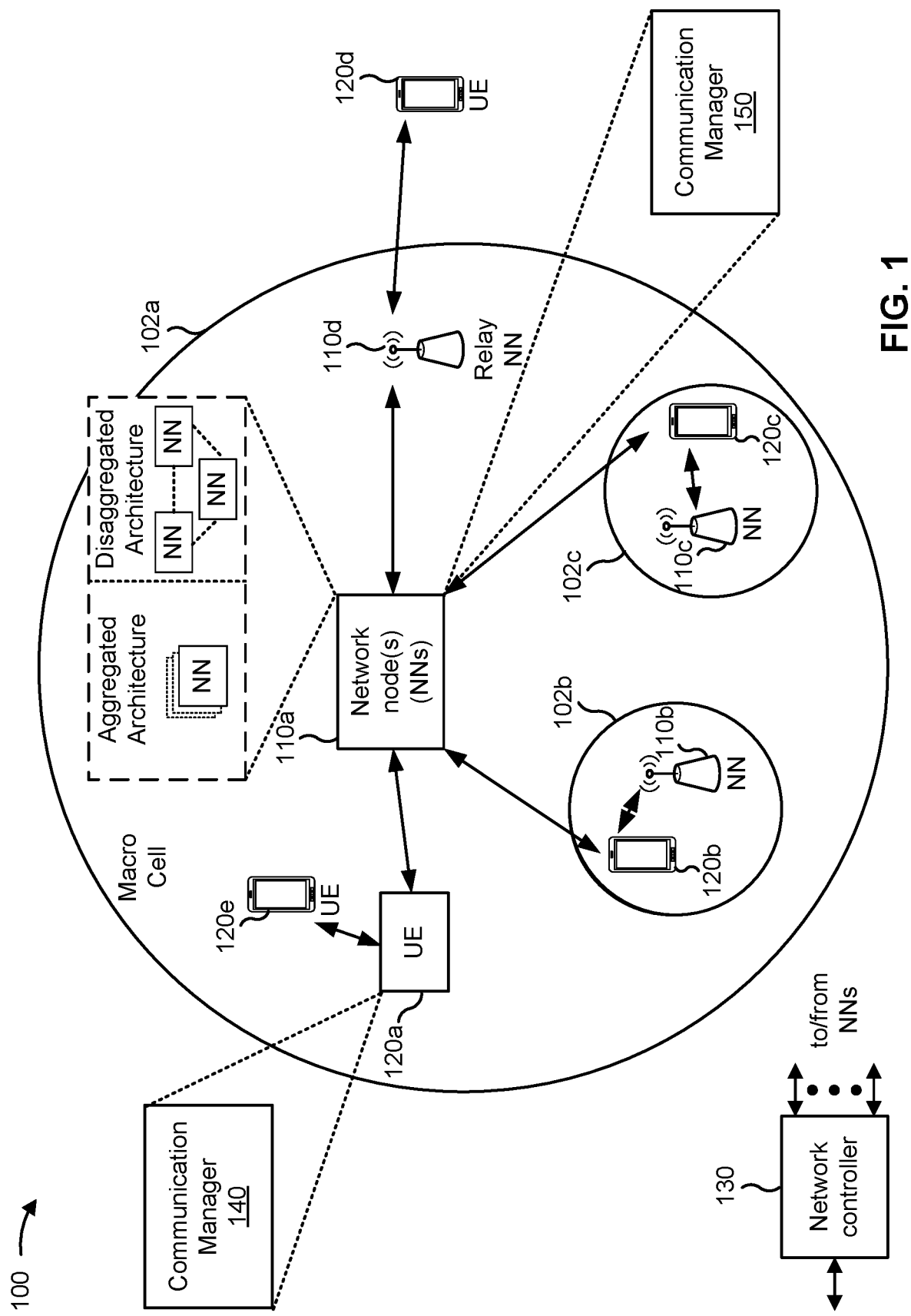
FIG. 1 is a diagram illustrating an example of a wireless network, in accordance with the present disclosure.

In some examples, sub-THz bands (e.g., 90 GHz-300 GHz) may be used in a wireless network. For example, sub-THz bands are candidates for use in a sixth generation (6G) radio access technology (RAT) due to the large available bandwidth on sub-THz bands. In some examples, discrete Fourier transform (DFT) precoding may be avoided and a single carrier (SC) waveform may be used for transmission on sub-THz bands in order to reduce power consumption and complexity. Because a sub-THz channel is line of sight (LOS), the sub-THz channel may have a small channel time response. However, due to radio frequency (RF) droop and/or flatness associated with the high bandwidth of the sub-THz channel, the channel may become dispersive, resulting in a longer time domain (TD) response which may cause inter-symbol interference (ISI) in the SC waveform. In some examples, TD equalization may be performed at a receiver device (e.g., a user equipment (UE)) to equalize the channel and reduce ISI in the SC waveform. For example, the TD equalization may be performed using decision feedback equalization or another TD filtering technique. The TD equalization performed by the receiver device (e.g., the UE) may have a limited number of coefficients, which may limit the channel equalization processing gain (according to the channel) and result in an ISI noise floor for communications received by the receiver device.

Various aspects generally relate to UE TD equalization capability reporting. Some aspects more specifically relate to a UE signaling TD equalization capabilities and/or limitations to a network node in order to jointly reduce ISI for downlink communications. In some examples, a UE may transmit, to a network node, a supported channel latency indication that indicates a supported channel latency for TD equalization by the UE. For example, the supported channel latency may be a latency constraint arising from the physical channel with respect to TD equalization limitations of the UE. In some examples, the supported channel latency may be based at least in part on a number of taps tracked by one or more filters of a TD equalizer of the UE. The UE may receive, from the network node, a downlink communication based at least in part on the supported channel latency indication. In some examples, the network node may perform link optimization for a downlink channel associated with the downlink communication based at least in part on the indicated supported channel latency for TD equalization by the UE. For example, the network node may reduce a bandwidth associated with the downlink channel, reduce a quantity of component carriers (CCs), select a CC (e.g., switch to a different CC), and/or perform pre-equalization of the downlink communication based at least in part on the indicated supported channel latency.

Particular aspects of the subject matter described in this disclosure can be implemented to realize one or more of the following potential advantages. In some examples, by reporting the UE capability for TD equalization (e.g., the supported channel latency indication), the described techniques enable a network node to optimize a downlink channel between the network node and the UE based at least in part on the UE capability for TD equalization. As a result, the link optimization performed by the network node and the TD equalization performed by the UE may jointly reduce ISI in downlink communications transmitted to the UE. In some examples, by reporting the supported channel latency for TD equalization by the UE, the described techniques enable the UE to report the UE capability for TD equalization without the UE reporting the specific implementation used by the UE to perform TD equalization.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) RAT, aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node, a supported channel latency indication that indicates a supported channel latency for time domain equalization by the UE 120; and receive, from the network node, a downlink communication based at least in part on the supported channel latency indication. Additionally, or alternatively, the communication manager 140 may perform one or more other operations described herein.

In some aspects, the network node 110 may include a communication manager 150. As described in more detail elsewhere herein, the communication manager 150 may receive, from a UE, a supported channel latency indication that indicates a supported channel latency for time domain equalization by the UE; and transmit, to the UE, a downlink communication based at least in part on the supported channel latency indication. Additionally, or alternatively, the communication manager 150 may perform one or more other operations described herein.

As indicated above, FIG. 1 is provided as an example. Other examples may differ from what is described with regard to FIG. 1.

Figure 2:
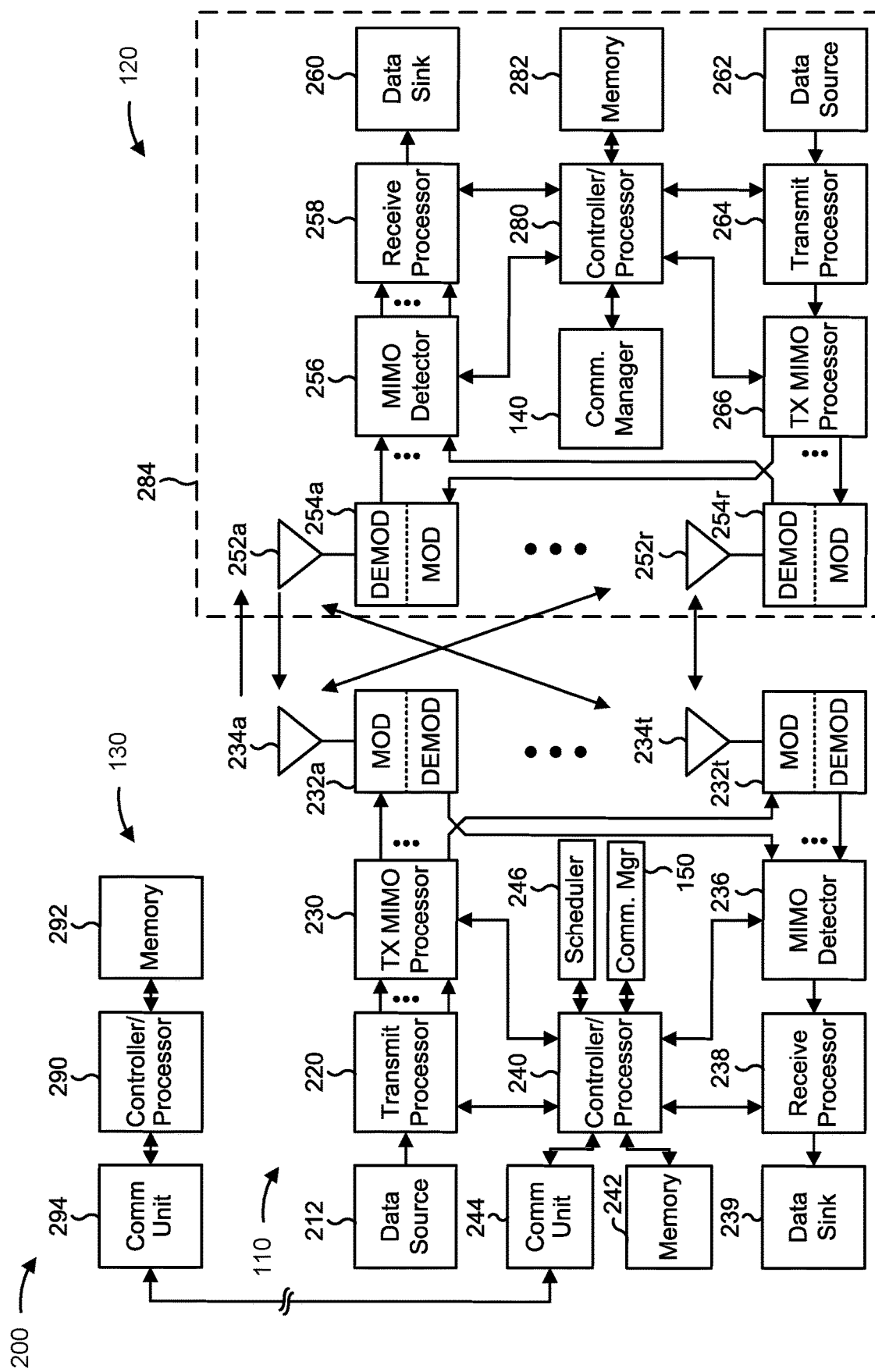
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the network node 110, the controller/processor 280 of the UE 120, and/or any other component(s) of FIG. 2 may perform one or more techniques associated with UE time domain equalization capability reporting, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting, to a network node, a supported channel latency indication that indicates a supported channel latency for time domain equalization by the UE; and/or means for receiving, from the network node, a downlink communication based at least in part on the supported channel latency indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving, from a UE, a supported channel latency indication that indicates a supported channel latency for time domain equalization by the UE; and/or means for transmitting, to the UE, a downlink communication based at least in part on the supported channel latency indication. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
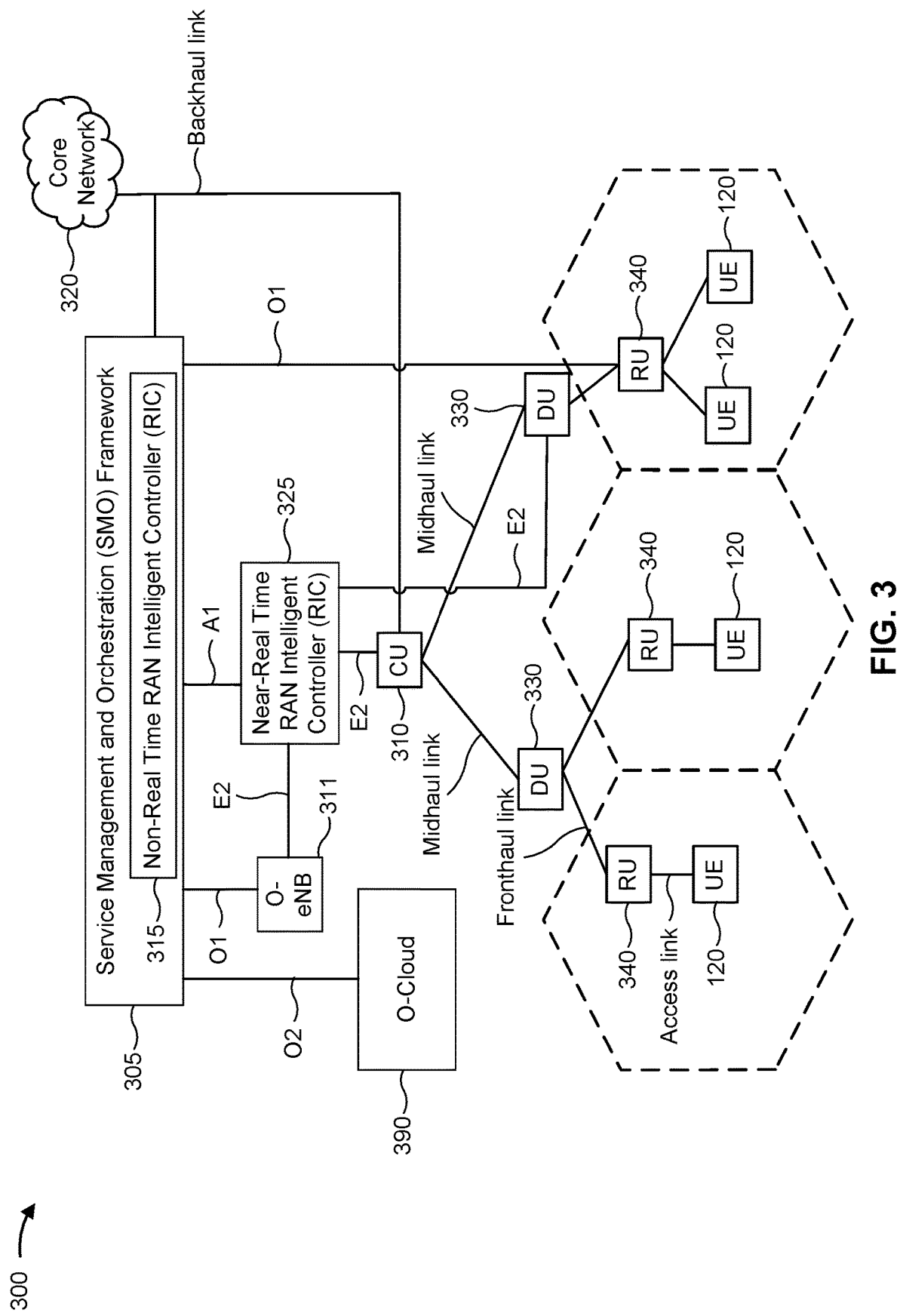
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
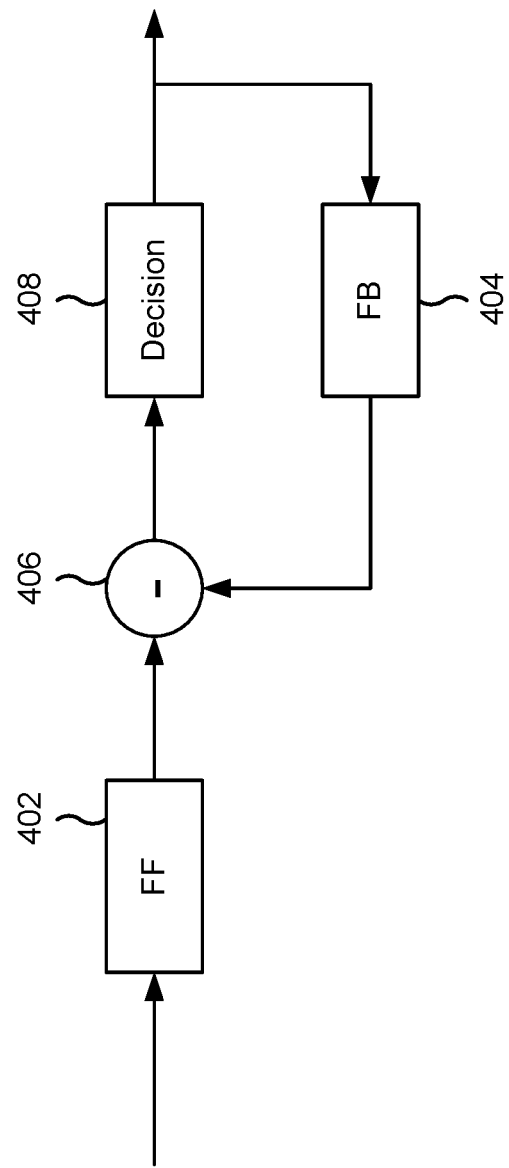
FIG. 4 is a diagram illustrating an example of a decision feedback equalizer (DFE), in accordance with the present disclosure.

FIG. 4 is a diagram illustrating an example 400 of a decision feedback equalizer (DFE), in accordance with the present disclosure.

ISI may occur in a wireless transmission when the transmitted bandwidth exceeds the channel's coherence bandwidth. In some examples, a receiver device (e.g., a UE) may apply TD equalization to reduce ISI. For example, the receiver device may include a TD equalizer to perform TD equalization on communications received at the receiver device. TD equalization may be achieved by removing (or reducing) the effects of previous time domain symbols from a current symbol being detected.

In some examples, a DFE, such as the DFE shown in example 400, may perform TD equalization (e.g., decision feedback equalization) at a receiver device (e.g., a UE). That is, the TD equalizer included in the receiver device may be a DFE. As shown in FIG. 4, the DFE may include a feed forward (FF) filter 402, a feedback (FB) filter 404, a summer 406, and a decision component 408. The FF filter 402 and the FB filter 404 may be finite impulse response (FIR) filters. Signals received by a receiver device (e.g., a UE) over a plurality of time domain symbols may be input to the FF filter 402. The signals may be input to the FF filter 402 as a stream of samples, with each sample input in a respective symbol. The FF filter 402 may be associated with (e.g., may track) a number of taps, where each tap corresponds to a respective delay for a signal in the time domain. For example, each tap may correspond to a respective symbol, and the number of taps for the FF filter 402 may include taps corresponding to the current symbol and one or more previous symbols. Each tap for the FF filter 402 may be associated with a respective tap coefficient. The FF filter 402 may filter an input sample based at least in part on the received samples and the respective tap coefficients for the number of taps associated with the FF filter 402. For example, the output of FF filter may be based at least in part on a weighted sum of the received samples, weighted by the respective tap coefficients, for the current symbol and one or more previous symbols.

The FB filter 404 may feedback a weighted sum of past decisions (output by the decision component 408) for a number of previous symbols to cancel the ISI caused by the previous samples in a current sample. For example, the FB filter 404 may be associated with a number of taps, and each tap for the FB filter 404 may be associated with a respective tap coefficient. The FB filter 404 may input a symbol decision (e.g., a detected or filtered value) output by the decision component 408 at each symbol, and the FB filter 404 may output the weighted sum of past decisions for a number of previous symbols. The number of taps for the FB filter 404 may correspond to number of past decisions (for previous symbols) to be included in the weighted sum of past decisions, and each past decision may be weighted by the respective tap coefficient. The summer 406 may subtract the output of the FB filter 404 from the output of the FF filter 402, and the resulting signal may be input to the decision component 408.

The decision component 408 may determine and output the symbol decision for the current symbol based on the signal output from the summer 406. For example, the decision component 408 may be a slicer or a threshold detector. The symbol decision may be a detected or filtered value (e.g., filtered to remove or reduce ISI) for the current symbol. For example, the detected or filtered value for the current symbol may be a constellation point determined for the current symbol. In some examples, the decision component 408 may compare the signal output by the summer 406 to a threshold, and the decision component 408 may output a first value based at least in part on the signal satisfying the threshold or a second value based at least in part on the signal not satisfying the threshold.

In some examples, the DFE may be an adaptive filter. In such examples, the tap coefficients for the FF filter 402 and the FB filter 404 may be continuously or periodically updated to reduce an error between a desired signal and the signal output by the DFE (e.g., the signal output by the decision component 408) based at least in part on real time pilot signals (e.g., pilot symbols) and/or data signals.

UEs may have various DFE designs (or other TD equalizer designs) with different tap configurations (e.g., different numbers of taps) for the FF filter 402 and the FB filter 404. In some examples, for given channel conditions, increasing the tap complexity (e.g., the total number of FF taps and FB taps) may result in signal-to-noise ratio (SNR) improvements for communications via the channel. Furthermore, in some examples, for given channel conditions, increasing the number of FB taps (e.g., taps for the FB filter 404) while maintaining the same overall complexity (e.g., the total number of FF taps and FB taps) may result in SNR improvements for communications via the channel. In some aspects, the length of the TD equalization (e.g., the supported channel latency for TD equalization) may have a great impact on a UE's complexity capabilities when considering both the FF filter 402 and the FB filter 404 (or other filters associated with another type of TD equalization) for SNR improvement. The length of the TD equalization may also have a great impact on the overall performance and/or latency of the TD equalization.

Some techniques and apparatuses described herein enable a UE to report, to a network node, a TD equalization capability of the UE. In some aspects, the UE may transmit, to the network node, a supported channel latency indication that indicates a supported channel latency for TD equalization by the UE. For example, the supported channel latency may be a latency constraint arising from the physical channel with respect to TD equalization limitations of the UE. In some examples, the supported channel latency may be based at least in part on a number of taps tracked by one or more filters of a TD equalizer of the UE. The UE may receive, from the network node, a downlink communication based at least in part on the supported channel latency indication. In some examples, the network node may perform link optimization for a downlink channel associated with the downlink communication based at least in part on the indicated supported channel latency for TD equalization by the UE. For example, the network node may reduce a bandwidth associated with the downlink channel, reduce a quantity of CCs, select a CC (e.g., switch to a different CC), and/or perform pre-equalization of the downlink communication based at least in part on the indicated supported channel latency. As a result, the link optimization performed by the network node and the TD equalization performed by the UE may jointly reduce ISI in downlink communications transmitted to the UE. In some aspects, by reporting the supported channel latency for TD equalization by the UE, the described techniques enable the UE to report the UE capability for TD equalization by without the UE reporting the specific implementation used by the UE to perform TD equalization.

As indicated above, FIG. 4 is provided as an example. Other examples may differ from what is described with respect to FIG. 4.

Figure 5A:
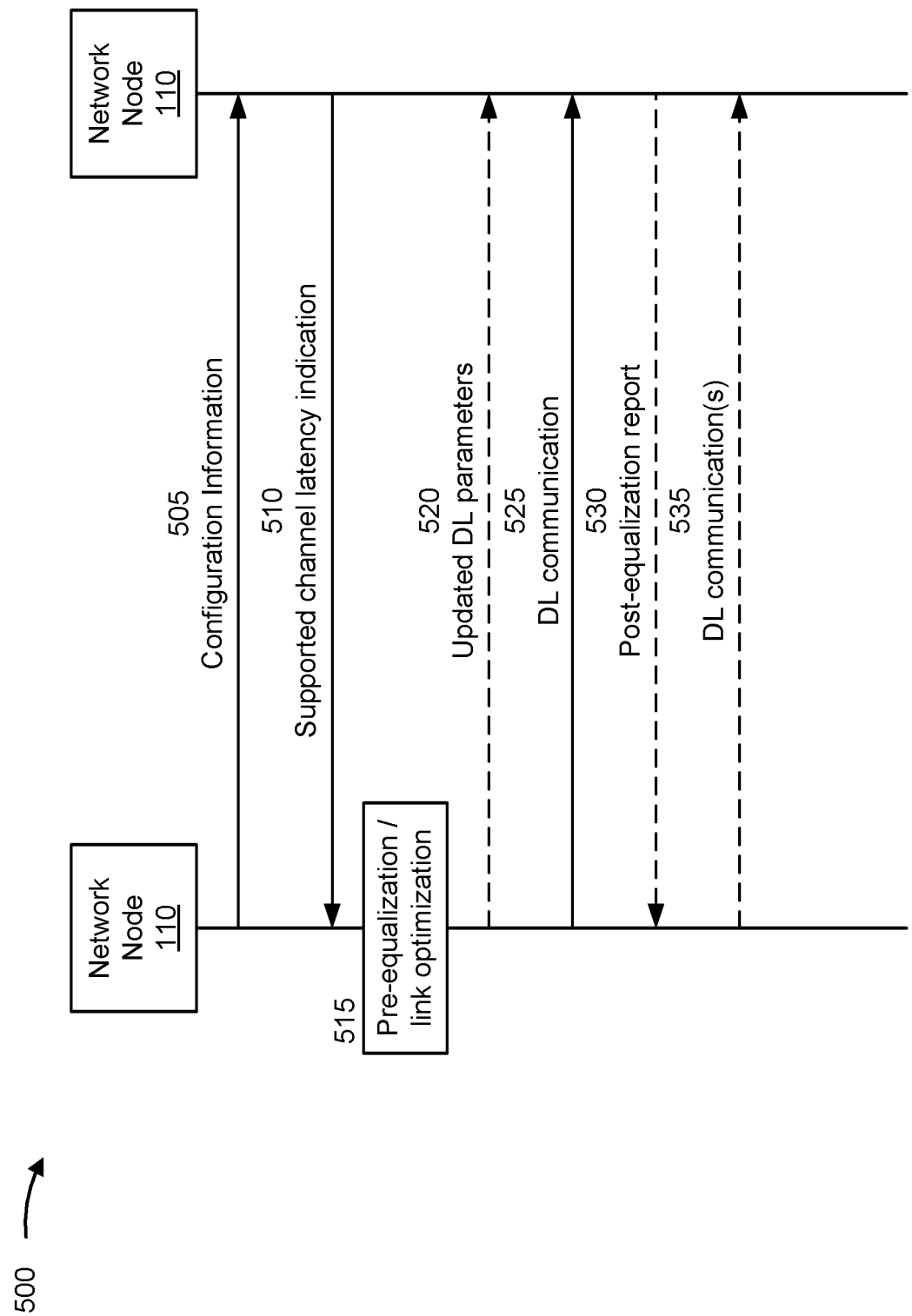
FIGS. 5A-5C are diagrams illustrating an example associated with UE time domain equalization capability reporting, in accordance with the present disclosure.
Figure 5B:
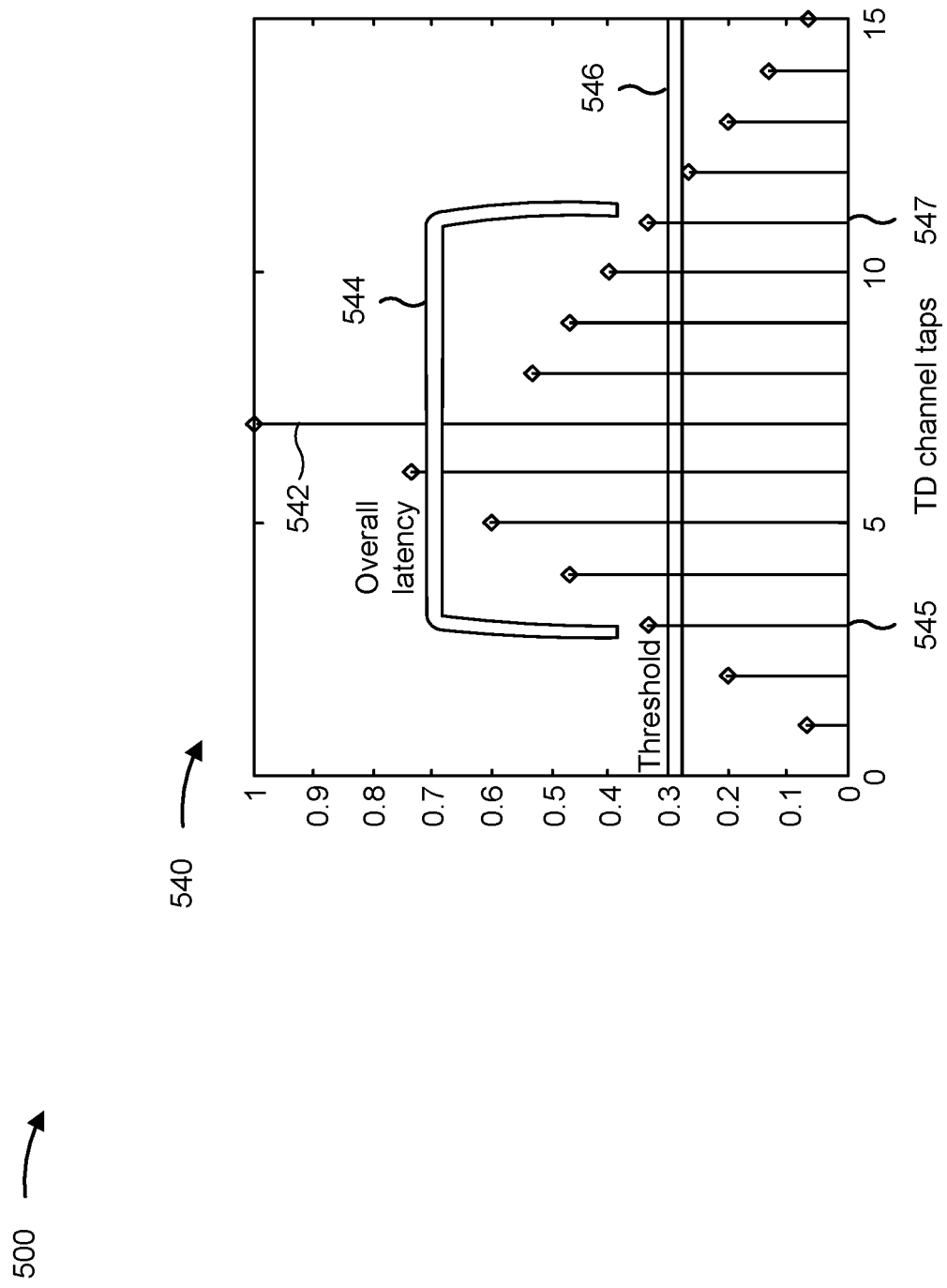
Figure 5C:
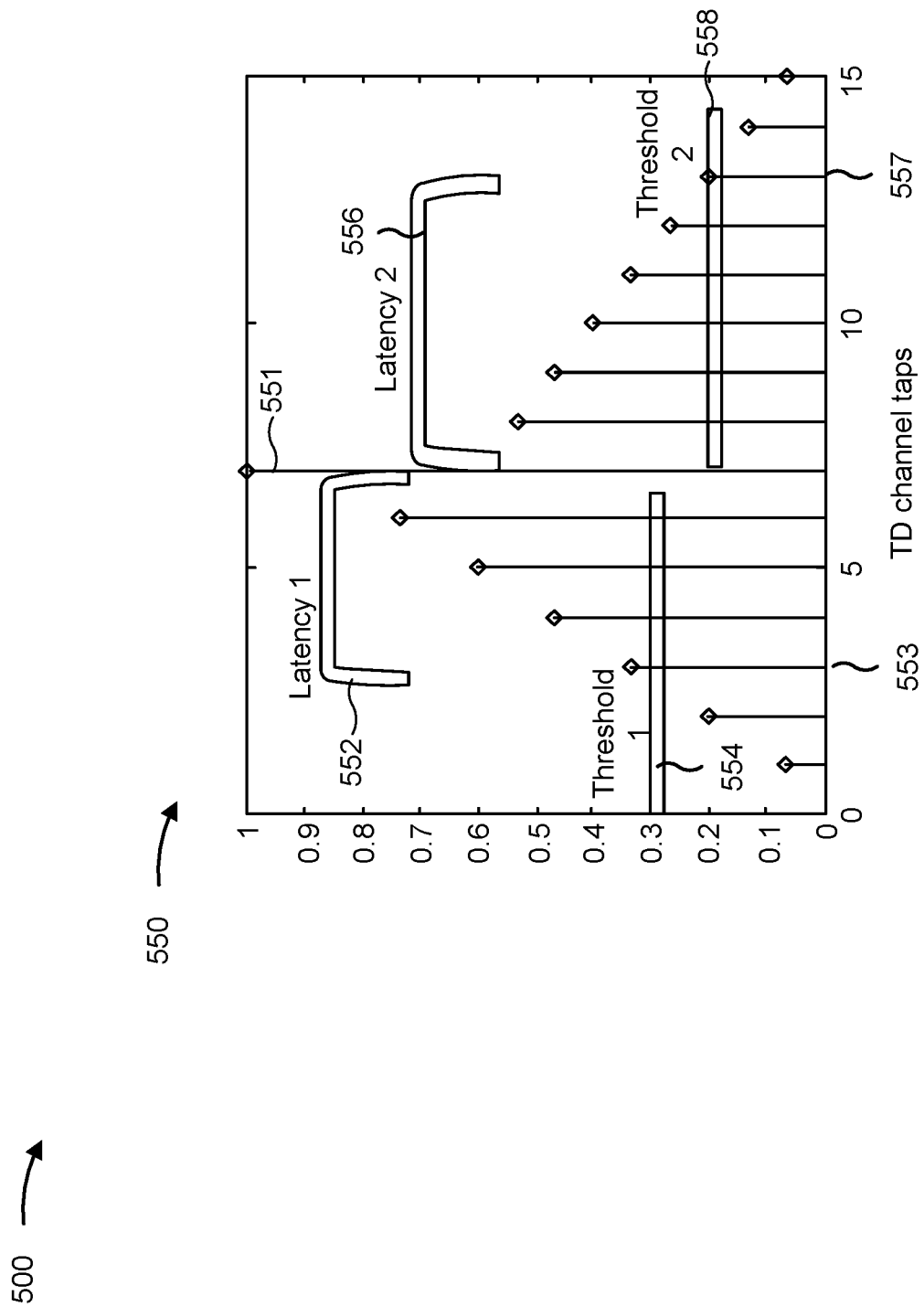

FIGS. 5A-5C are diagrams illustrating an example 500 associated with UE time domain equalization capability reporting, in accordance with the present disclosure. As shown in FIG. 5A, example 500 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 5A, and by reference number 505, the network node 110 may transmit, and the UE 120 may receive, configuration information. In some aspects, the UE 120 may receive the configuration information via one or more of system information (e.g., a master information block (MIB) and/or a system information block (SIB), among other examples), RRC signaling, one or more MAC control elements (MAC-CEs), and/or downlink control information (DCI), among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication may include a dynamic indication, such as one or more MAC CEs and/or one or more DCI messages, among other examples.

In some aspects, the configuration information may indicate that the UE 120 is to report a supported channel latency for TD equalization by the UE 120. For example, the configuration information may include a request for the UE 120 to transmit capability information that indicates the supported channel latency for TD equalization. In some aspects, the configuration information may configure one or more downlink reference signals (e.g., channel state information (CSI) reference signals (CSI-RSs)) to be transmitted to the UE 120, and the configuration may configure one or more reports (e.g., CSI reports), associated with the downlink reference signals, to be transmitted by the UE 120. In some aspects, the configuration information may indicate that the UE 120 is to report the supported channel latency for TD equalization in a report (e.g., a CSI report) associated with one or more downlink reference signals. In some aspects, the configuration information may indicate that the UE 120 is to report other information, such as an observed channel latency, power consumption information associated with time domain equalization, and/or computational resource information associated with time domain equalization, among other examples, together with the supported channel latency.

In some aspects, the configuration information may indicate one or more downlink communication parameters. In some examples, the configuration information may indicate one or more CCs to be used for downlink communications. In some examples, the configuration information may indicate a downlink bandwidth part (BWP) to be used for downlink communication. For example, the configuration information may indicate a downlink BWP per CC configured for the UE 120. In some aspects, the configuration information may indicate a selected CC (e.g., an active CC), of the one or more CCs configured for the UE 120, to be used for downlink communications.

The UE 120 may configure itself based at least in part on the configuration information. In some aspects, the UE 120 may be configured to perform one or more operations described herein based at least in part on the configuration information.

As shown by reference number 510, the UE 120 may transmit, and the network node 110 may receive, a supported channel latency indication. The supported channel latency indication may indicate a supported channel latency for TD equalization by the UE 120. The supported channel latency for TD equalization may be based at least in part on a capability of the UE 120 for TD equalization, a type of a TD equalizer (e.g., a DFE or another type of TD equalizer) of the UE 120, and/or a complexity of the TD equalizer (e.g., the DFE or another type of TD equalizer) of the UE 120.

In some aspects, the supported channel latency for TD equalization may be a latency constraint arising from a physical channel (e.g., a physical downlink channel) with respect to TD equalization capabilities and/or limitations of the UE 120. For example, the supported channel latency may be based at least in part on a number of taps tracked by one or more filters of a TD equalizer of the UE. For example, in a case in which the TD equalizer of the UE 120 is a DFE, the number of taps tracked by the FF filter and the FB filter of a DFE may limit the supported channel latency on each side of a main tap (e.g., a strongest tap). In some aspects, transmitting the supported channel latency indication may enable the UE 120 to signal a capability of the UE 120 for TD equalization, which may be used by the network node 110 for pre-equalization and/or link optimization, without reporting the specific implementation (e.g., the type of TD equalizer, the complexity of the TD equalizer, and/or the tap configurations of the filters of the TD equalizer, among other examples) used by the UE 120 to perform TD equalization.

In some aspects, the supported channel latency indication may indicate a supported time gap (e.g., a supported latency) between a first channel tap that satisfies a threshold and a last channel tap that satisfies the threshold. In some examples, the threshold may be associated with a power level of the channel taps. For example, a channel tap may satisfy the threshold in connection with a power level of a received signal associated with the channel tap (or a relative power level with respect as compared with one or more other channel taps) exceeding the threshold. FIG. 5B shows an example 540 of TD channel taps associated with a downlink communication. Example 540 shows relative power levels for the channel taps with respect to a power level of a strongest channel tap 542. The strongest channel tap 542 may also be referred to the main tap. As shown in FIG. 5B, an overall latency 544 for TD equalization may be a time gap between a first channel tap 545 that satisfies a threshold 546 and a last channel tap 547 that satisfies the threshold 546. In some aspects, the supported channel latency indication may indicate a maximum latency (e.g., maximum time gap) supported (or a requested or desired maximum latency) for the overall latency 544 for TD equalization.

In some aspects, the threshold 546 may represent the remaining ISI that will not be filtered or equalized by the TD equalization performed by the UE 120. For example, the UE 120 may support performing TD equalization to filter the ISI associated with the channel taps that satisfy the threshold 546, but the UE 120 may not support performing TD equalization to filter the ISI associated with the channel taps that do not satisfy the threshold 546. In some aspects, the threshold 546 may be pre-defined. For example, the UE 120 may be pre-configured with the threshold 546. In some aspects, the network node 110 may signal the threshold 546 to the UE 120. For example, the threshold 546 may be indicated in the configuration information. In such examples, the network node 110 may periodically update the configured threshold 546. In some examples, the threshold 546 may be dynamically indicated (e.g., via DCI) by the network node 110. In some aspects, the UE 120 may signal the threshold 546 to the network node 110. For example, the UE 120 may transmit, to the network node 110, an indication of the threshold 546 in a same communication as the supported channel latency indication. In such examples, the threshold 546 may be based at least in part on a complexity and/or a capability of the TD equalizer (e.g., a DFE or another type of TD equalizer) of the UE 120.

In some aspects, the supported channel latency indication may indicate a first supported time gap (e.g., a first supported latency) between a first channel tap, prior to the strongest channel tap, that satisfies a first threshold and the strongest channel tap, and a second supported time gap (e.g., a second supported latency) between the strongest channel tap and a last channel tap, subsequent to the strongest channel tap, that satisfies a second threshold. FIG. 5C shows an example 550 of TD channel taps associated with a downlink communication. Example 550 shows relative power levels for the channel taps with respect to a power level of a strongest channel tap 551. The strongest channel tap 551 may also be referred to the main tap. As shown in FIG. 5C, a first latency 552 for TD equalization may be defined on one side of the strongest channel tap 551 (e.g., prior to the strongest channel tap 551), and a second latency 556 may be defined on the other side of the strongest channel tap 551 (e.g., after the strongest channel tap 551). The first latency 552 may be a time gap (e.g., a first time gap) between a first channel tap 553 that satisfies a first threshold 554 and the strongest channel tap 551. The second latency

556 may be a time gap (e.g., a second time gap) between the strongest channel tap 551 and a last channel tap 557 that satisfies a second threshold 558. In some aspects, the supported channel latency indication may indicate a maximum latency (e.g., a maximum time gap) supported (or a requested or desired maximum latency) for the first latency 552 and a maximum latency (e.g., a maximum time gap) supported (or a requested or desired maximum latency) for the second latency 556.

In some examples in which the TD equalizer of the UE 120 is a DFE, the FF filter of the DFE may affect the full channel, whereas the FB of the DFE may affect only the channel taps that are after the main tap (e.g., the strongest channel tap). Accordingly, in some aspects, the first supported time gap (prior to the strongest channel tap) may be based on or otherwise associated with the FF filter, and the second supported time gap (after the strongest channel tap) may be based on or otherwise associated with the FB filter. In some examples, the second supported time gap the second supported time gap (after the strongest channel tap) may be based on or otherwise associated with the FB filter and the FF filter. In some aspects, the first threshold 554 and the second threshold 558 may be different thresholds. For example, different thresholds (e.g., the first threshold 554 and the second threshold 558) may be applied on the opposite sides of the strongest channel tap based at least in part on the FF filter and the FB filter having different responses in the time domain on the equalization.

In some aspects, the first threshold 554 and the second threshold 558 may be pre-defined. For example, the UE 120 may be pre-configured with the first threshold 554 and the second threshold 558. In some aspects, the network node 110 may signal the first threshold 554 and the second threshold 558 to the UE 120. In some examples, the first threshold 554 and the second threshold 558 may be indicated in the configuration information. In such examples, the network node 110 may periodically update the configured values for the first threshold 554 and the second threshold 558. In some examples, the first threshold 554 and the second threshold 558 may be dynamically indicated (e.g., via DCI) by the network node 110. In some aspects, the UE 120 may signal the first threshold 554 and the second threshold 558 to the network node 110. For example, the UE 120 may transmit, to the network node 110, signaling indicating the first threshold 554 and the second threshold 558 in a same communication as the supported channel latency indication that indicates the first supported time gap and the second supported time gap. In such examples, the first threshold 554 and the second threshold 558 may be based at least in part on a complexity and/or a capability of the TD equalizer (e.g., a DFE or another type of TD equalizer) of the UE 120. For example, the first threshold 554 and the second threshold 558 may be based at least in part on the number of FF taps and the number of FB taps for a DFE of the UE 120.

In some aspects, the UE 120 may report a respective maximum supported channel latency, per CC, for each of one or more CCs configured for the UE 120. For example, the supported channel latency indication may include a respective maximum supported channel latency for TD equalization for each of one or more CCs. In such examples, the respective maximum supported channel latency, for each CC, may be indicated as a supported time gap for an overall channel latency (as discussed in connection with FIG. 5B) or as a first supported time gap prior to a strongest channel tap and a second supported time gap subsequent to the strongest channel tap (as discussed in connection FIG. 5C).

In some aspects, the supported channel latency indication may include power consumption information associated with TD equalization by the UE 120 and/or computational resource information associated with TD equalization by the UE 120. For example, the power consumption information may indicate power consumption (e.g., relative power consumption) at the UE 120 per filter configuration for each filter (e.g., the FF filter and the FB filter) of the TD equalizer of the UE 120. The computation resource information may indicate computational resources utilization (e.g., relative computational resource utilization) at the UE 120 per filter configuration for each filter (e.g., the FF filter and the FB filter) of the TD equalizer of the UE 120. In some aspects, the power consumption information and/or the computational resource information may enable the network node 110 to optimize throughput and power consumption at the UE 120 when performing pre-equalization and/or link optimization based at least in part on the supported channel latency indication received from the UE 120.

In some aspects, the UE 120 may transmit the supported channel latency indication to the network node 110 based at least in part on RRC signaling configuring the UE 120 to report the supported channel latency indication, and/or based at least in part on a MAC-CE or DCI indicating that the UE 120 is to report the supported channel latency indication. In some aspects, the supported channel latency indication may be included in UE capability information transmitted by the UE 120 to the network node 110. For example, the UE 120 may transmit UE capability information including the supported channel latency indication as part of a procedure for establishing an initial connection with the network node 110.

In some aspects, the UE 120 may transmit the supported channel latency indication in a report (e.g., a CSI report) associated with one or more downlink reference signals (e.g., CSI-RSs) transmitted by the network node 110 and received by the UE 120. In such examples, the UE 120 may report the supported channel latency indication and an observed channel latency indication that indicates an observed channel latency of the channel based at least in part on the one or more downlink reference signals. In some examples, the observed channel latency indication may indicate an overall observed channel latency for TD equalization. For example, the overall observed channel latency may be an observed time gap between a first channel tap that satisfies a threshold (e.g., threshold 546 of FIG. 5B) and a last channel tap that satisfies the threshold. In some other examples, the observed channel latency indication may indicate an observed first latency prior to a strongest channel tap and an observed second latency subsequent to the strongest channel tap. For example, the observed first channel latency may be a first observed time gap between a first channel tap that satisfies a first threshold (e.g., first threshold 554 of FIG. 5C) and the strongest channel tap, and the observed second channel latency may be a second observed time gap between the strongest channel tap and a last channel tap that satisfies a second threshold (e.g., second threshold 558 of FIG. 5C).

In some aspects, the network node 110 may transmit, and the UE 120 may receive, one or more downlink reference signals (e.g., CSI-RSs) including a respective downlink reference signal associated with each of one or more CCs. In such examples, the UE 120 may report, in one or more reports associated with the one or more downlink reference signals, a respective supported channel latency indication for each CC of the one or more CCs and a respective observed channel latency indication for each CC of the one or mor CCs. For example, the network node 110 may transmit, and the UE 120 may receive, a first CSI-RS associated with a first CC and a second CSI-RS associated with a second CC. The UE 120 may report the observed latency of the channel (e.g., the observed channel latency indication) and a desired/requested latency limitation (e.g., the supported channel latency indication) for each of the first CC and the second CC. For example, the UE 120 may transmit a first CSI-RS report including the observed channel latency indication and the supported channel latency indication for the first CC and a second CSI-RS report including the observed channel latency indication and the supported channel latency indication for the second CC, or the UE 120 may transmit a single CSI-RS report including the observed channel latency indication the supported channel latency indication for the first CC and the observed channel latency indication and the supported channel latency indication for the second CC.

Returning to FIG. 5A, as shown by reference number 515, the network node 110 may perform pre-equalization of a downlink communication and/or link optimization for a link between the network node 110 and the UE 120 based at least in part on the supported channel latency indication.

In some aspects, the network node 110 may perform downlink channel pre-equalization based at least in part on the supported channel latency indication. The pre-equalization may be based on changing a power delay profile (PDP) associated with a downlink communication on the downlink channel to match the UE constraint(s) indicated in the supported channel latency indication. In some aspects, the network node 110 may pre-equalize the downlink channel (e.g., the downlink communication) to adjust the PDP such that the PDP satisfies a supported overall channel latency indicated in the supported channel latency indication (e.g., such that the time gap between the first channel tap that satisfies the threshold and the last channel tap that satisfies the threshold is less than or equal to the indicated supported time gap). In some aspects, the network node 110 may pre-equalize the downlink channel (e.g., the downlink communication) to adjust the PDP such that the PDP satisfies a supported first latency prior to the strongest channel tap and a supported second latency subsequent to the strongest channel tap (e.g., such that a first time gap between the first channel tap that satisfies the first threshold and the strongest channel tap is less than or equal to the indicated first supported time gap, and a second time gap between the strongest channel tap and a last channel tap that satisfies the second threshold is less than or equal to the indicated second supported time gap). In some aspects, the network node 110 may pre-equalize the downlink channel (e.g., the downlink communication) to filter taps outside of the supported channel latency (e.g., taps that do not satisfy the threshold (or the first or second threshold)) that will not be filtered by the TD equalization performed by the UE 120, to reduce ISI based on those taps. In some aspects, the network node 110 may perform pre-equalization of the downlink channel (e.g., the downlink communication) to filter channel taps that are related to the FF filter of the TD equalizer (e.g., DFE) of the UE 120 in a case in which reducing the number of taps for the FF filter of the UE 120 may enable the UE 120 to potentially increase the number of taps of the FB filter (e.g., according to the supported channel latency and/or other information reported by the UE 120).

In some aspects, the pre-equalization performed by the network node 110 (and/or other link optimization described below) may be based at least in part on the supported channel latency reported by the UE 120, as well as the power consumption information and/or the computational resource information reported by the UE 120. In some aspects, the pre-equalization may be based at least in part on the supported channel latency reported by the UE 120 and the observed channel latency reported by the UE 120. For example, in a case in which the supported channel latency (e.g., the desired or requested channel latency) reported by the UE 120 is lower than the observed channel latency of the PDP of the downlink channel, the network node 110 may determine whether to fully pre-equalize the downlink channel or to pre-equalize the downlink channel to adjust the PDP to match the constraint(s) associated with the supported channel latency.

In some aspects, the network node 110 may perform other link optimization in addition to or instead of pre-equalization of the downlink channel. In some aspects, the network node 110 may determine a downlink BWP for one or more downlink communications for the UE 120 based at least in part on the supported channel latency indication. For example, the network node 110 may reduce a bandwidth size of a downlink BWP based at least in part on the supported channel latency indication to reduce RF droop and/or flatness, and thus reduce ISI in downlink communications transmitted to the UE 120. In some examples, the network node 110 may reduce the bandwidth size of a downlink BWP configured for the UE 120 according to a gap between an observed channel latency associated with the PDP of the downlink channel (e.g., the observed channel latency reported by the UE 120) and the supported channel latency (e.g., the desired or requested channel latency) reported by the UE 120.

In some aspects, the network node 110 may determine a quantity of CCs based at least in part on the supported channel latency indication. For example, the network node 110 may reduce the quantity of CCs configured (or activated) for the UE 120 to reduce ISI and/or otherwise optimize downlink communications for the UE 120 based at least in part on the supported channel latency and/or other information reported by the UE 120. In some examples, the network node 110 may reduce the quantity of CCs (e.g., to one CC) configured or activated for the UE 120 based at least in part on a determination that the supported channel latency (e.g., the desired or requested channel latency) reported by the UE 120 is lower than the observed channel latency of the PDP of the downlink channel.

In some aspects, the network node 110 may select a CC from multiple CCs configured or activated for the UE 120 based at least in part on the supported channel latency indication. For example, the network node 110 may switch a CC allocated for a downlink communication to a CC with best channel conditions based at least in part on the respective supported channel latency reported for each CC by the UE 120 and the respective observed channel latency reported for each CC by the UE 120.

As further shown in FIG. 5A, and by reference number 520, in some aspects, the network node 110 may transmit, and the UE 120 may receive, one or more updated downlink parameters. The one or more updated downlink parameters may include one or more downlink parameters updated by the network node 110 in connection with the link optimization based at least in part on the supported channel latency indication. In some examples, the one or more updated downlink parameters may be included in RRC signaling or a MAC-CE. In some other examples, the one or more updated downlink parameters may be indicated in DCI, such as DCI scheduling a downlink communication.

In some aspects, the network node 110 may transmit, and the UE 120 may receive, an indication of a downlink BWP determined based at least in part on the supported channel latency indication. For example, in a case in which the network node 110 reduces the bandwidth size of a downlink BWP configured for the UE 120 based at least in part on the supported channel latency indication, the network node 110 may transmit, and the UE 120 may receive, an indication of updated downlink BWP with a reduced bandwidth size as compared with a previous downlink BWP configured for the UE 120.

In some aspects, in a case in which the network node 110 determines a quantity of one or more CCs configured or activated for downlink communications for the UE 120 based at least in part on the supported channel latency indication, the network node 110 may transmit, and the UE 120 may receive, an indication of the one or more CCs configured or activated configured or activated for downlink communications. For example, in a case in which the network node 110 reduces the quantity of CCs configured or activated for downlink communications based at least in part on the supported channel latency indication, the network node 110 may transmit, and the UE 120 may receive, an indication of a reduced quantity of CCs as compared with a previous quantity of CCs configured or activated for downlink communications for the UE 120.

In some aspects, the network node 110 may transmit, and the UE 120 may receive, an indication of a selected CC selected by the network node 110 based at least in part on the supported channel latency indication. For example, in a case in which the network node 110 switches a CC allocated for a downlink communication based at least in part on the supported channel latency indication, the network node 110 may transmit, and the UE 120 may receive, an indication of a switch from a previous CC to the selected CC.

As further shown in FIG. 5A, and by reference number 525, the network node 110 may transmit, and the UE 120 may receive, a downlink communication based at least in part on the supported channel latency indication. For example, the downlink communication may be based at least in part on the pre-equalization and/or link optimization performed by the network node 110 based at least in part on the supported channel latency indication. In some aspects, the network node 110 may perform pre-equalization on the downlink communication based at least in part on the supported channel latency indication, as discussed in connection with reference number 515. In some aspects, in a case in which the network node 110 determines a downlink BWP (e.g., with a reduced bandwidth size) based at least in part on the supported channel latency indication, the network node 110 may transmit, and the UE 120 may receive, the downlink communication in the downlink BWP determined based at least in part on the supported channel latency indication. In some aspects, in a case in which the network node 110 determines a quantity of one or more CCs (e.g., a reduced quantity of CCs) for downlink communications for the UE 120 based at least in part on the supported channel latency indication, the network node 110 may transmit, and the UE 120 may receive, the downlink communication on a CC of the one or more CCs. In some aspects, in a case in which the network node 110 selects a CC (e.g., selects a CC to switch to) based at least in part on the supported channel latency indication, the network node 110 may transmit, and the UE 120 may receive, the downlink communication on the selected CC.

In some aspects, the UE 120 may perform TD equalization on the downlink communication. For example, a TD equalizer of the UE 120 may perform TD equalization on the downlink communication. In some examples, the TD equalizer of the UE 120 may be a DFE including a FF filter and a FB filter. In some other examples, the TD equalizer of the UE 120 may be another type of TD equalizer.

As further shown in FIG. 5A, and by reference number 530, is some aspects, in a case in which the network node 110 performs pre-equalization on the downlink communication, the UE 120 may transmit, and the network node 110 may receive, a post-equalization report based at least in part on receiving the downlink communication. The pre-equalization report may include an observed channel latency indication associated with the downlink communication.

In some aspects, the observed channel latency indication may indicate a latency of a first channel tap, or each channel tap, that satisfies a threshold (e.g., overall or per side of the main tap) after the pre-equalization performed by the network node 110 and/or the TD equalization performed by the UE 120. In some aspects, the observed channel latency indication may indicate an observed time gap between a first channel tap associated with the downlink communication that satisfies a threshold (e.g., threshold 546 of FIG. 5B) and a last channel tap associated with the downlink communication that satisfies the threshold. In some aspects, the observed channel latency indication may indicate a first observed time gap between a first channel tap associated with the downlink communication that satisfies a first threshold (e.g., first threshold 554 of FIG. 5C) and the strongest channel tap associated with the downlink communication, and a second observed time gap between the strongest channel tap associated with the downlink communication and a last channel tap associated with the downlink communication that satisfies a second threshold (e.g., second threshold 558 of FIG. 5C).

In some aspects, the UE 120 may report the post-equalization report in a periodic, semi-persistent, or aperiodic manner. For example, the UE 120 may report the post-equalization report based at least in part on configuration information received via RRC signaling or based at least in part on an activation command or trigger received via a MAC-CE or DCI. In some aspects, the post-equalization report may be channel condition and/or signal-to-interference-plus-noise ratio (SINR) dependent. For example, the UE 120 may transmit the post-equalization report to the network node 110 in connection with an SINR measured on the channel (e.g., an SINR of the downlink communication) satisfying a threshold. In some aspects, the measured SINR on the channel may be indicated in the post-equalization report.

In some aspects, the network node 110 may selectively perform further pre-equalization of the downlink channel (e.g., for one or more subsequent downlink communications) and/or other link optimization based at least in part on the observed channel latency indication included in the post-equalization report. For example, the network node 110 may perform further pre-equalization or other link optimization as discussed in connection with reference number 515. In some aspects, observed channel latency indication included in post-equalization report may assist the network node 110 in performing further pre-equalization and/or other link optimization to mitigate residual noise caused by ISI in the downlink channel. In some examples, the network node 110 may select whether to perform further pre-equalization and/or other link optimization based at least in part on the measured SINR on the channel (e.g., the measured SINR of the downlink communication). For example, in a case in which the SINR satisfies (e.g., is greater than or equal to) a threshold, the network node 110 may perform further pre-equalization and/or other link optimization. In a case in which the SINR does not satisfy (e.g., is less than) the threshold, the network node 110 may refrain from performing further pre-equalization and/or other link optimization for the downlink channel.

As further shown in FIG. 5A, and by reference number 535, in some aspects, the network node 110 may transmit, and the UE 120 may receive, one or more other downlink communications. The network node 110 may transmit one or more other downlink communications to the UE 120 subsequent to receiving the post-equalization report from the UE 120. In some aspects, the network node 110 may perform pre-equalization on the one or more other downlink communications based at least in part on the post-equalization report. In some aspects, the network node 110 may determine a downlink BWP, a quantity of CCs, and/or a selected CC for the one or more other downlink communications in accordance with link optimization based at least in part on the post-equalization report. In some other aspects, the network node 110 may transmit the one or more other downlink communications without performing any further pre-equalization and/or link optimization after receiving the post-equalization report.

As indicated above, FIGS. 5A-5C are provided as an example. Other examples may differ from what is described with respect to FIGS. 5A-5C.

Figure 6:
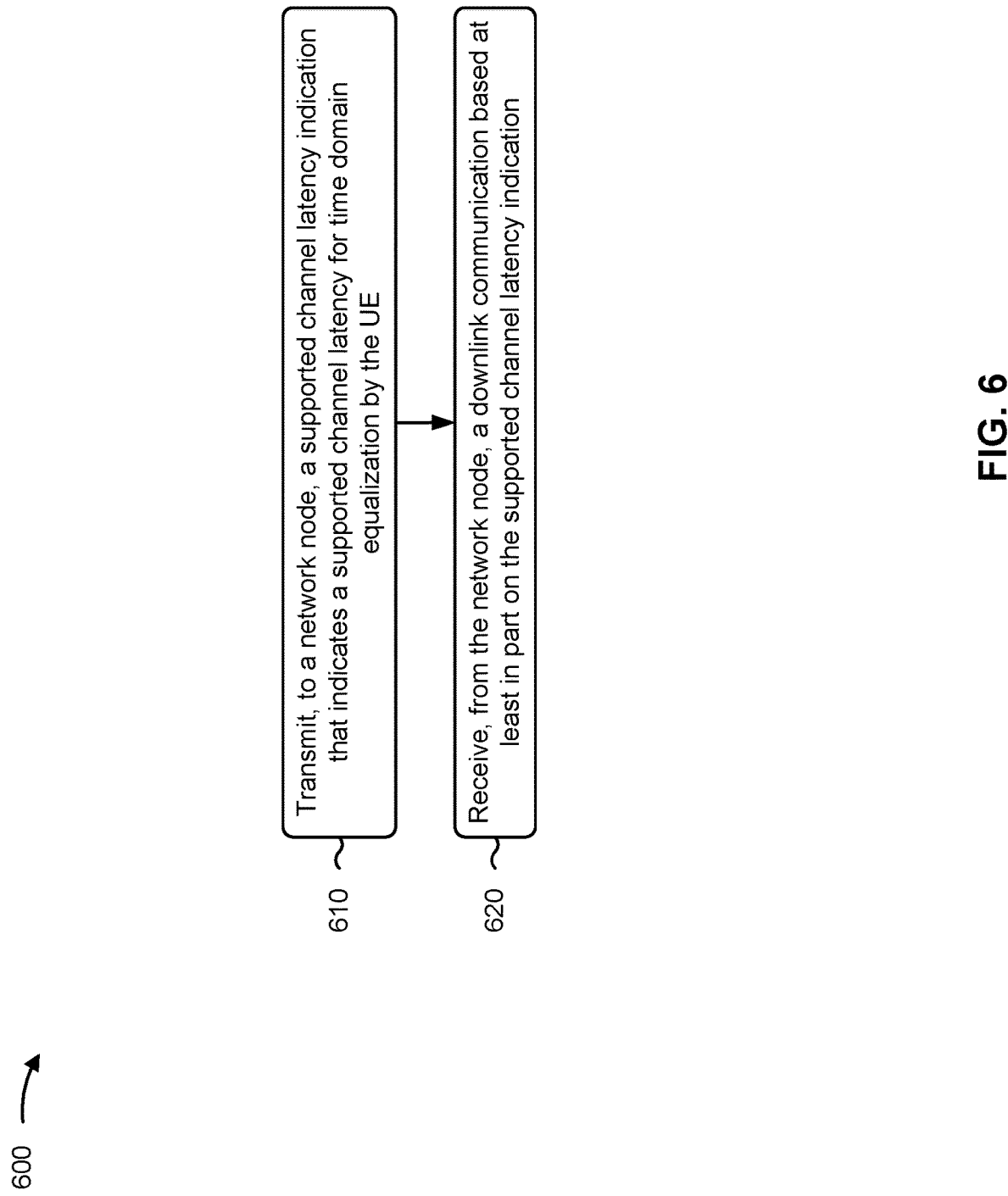
FIG. 6 is a diagram illustrating an example process performed, for example, at a UE or an apparatus of a UE, in accordance with the present disclosure.

FIG. 6 is a diagram illustrating an example process 600 performed, for example, at a UE or an apparatus of a UE, in accordance with the present disclosure. Example process 600 is an example where the apparatus or the UE (e.g., UE 120) performs operations associated with UE time domain equalization capability reporting.

As shown in FIG. 6, in some aspects, process 600 may include transmitting, to a network node, a supported channel latency indication that indicates a supported channel latency for time domain equalization by the UE (block 610). For example, the UE (e.g., using transmission component 804 and/or communication manager 806, depicted in FIG. 8) may transmit, to a network node, a supported channel latency indication that indicates a supported channel latency for time domain equalization by the UE, as described above.

As further shown in FIG. 6, in some aspects, process 600 may include receiving, from the network node, a downlink communication based at least in part on the supported channel latency indication (block 620). For example, the UE (e.g., using reception component 802 and/or communication manager 806, depicted in FIG. 8) may receive, from the network node, a downlink communication based at least in part on the supported channel latency indication, as described above.

Process 600 may include additional aspects, such as any single aspect or any combination of aspects described below and/or in connection with one or more other processes described elsewhere herein.

In a first aspect, the supported channel latency indication indicates a supported time gap between a first channel tap that satisfies a threshold and a last channel tap that satisfies the threshold.

In a second aspect, alone or in combination with the first aspect, process 600 includes receiving, from the network node, signaling indicating the threshold, or transmitting, to the network node, signaling indicating the threshold.

In a third aspect, alone or in combination with one or more of the first and second aspects, the supported channel latency indication indicates a first supported time gap between a first channel tap, prior to a strongest channel tap, that satisfies a first threshold and the strongest channel tap, and a second supported time gap between the strongest channel tap and a last channel tap, subsequent to the strongest channel tap, that satisfies a second threshold.

In a fourth aspect, alone or in combination with one or more of the first through third aspects, process 600 includes receiving, from the network node, signaling indicating the first threshold and the second threshold, or transmitting, to the network node, signaling indicating the first threshold and the second threshold.

In a fifth aspect, alone or in combination with one or more of the first through fourth aspects, the first supported time gap is associated with a feed forward filter associated with the time domain equalization and the second supported time gap is associated with a feedback filter associated with the time domain equalization.

In a sixth aspect, alone or in combination with one or more of the first through fifth aspects, the supported channel latency indication indicates a respective maximum supported channel latency for time domain equalization for each of one or more component carriers.

In a seventh aspect, alone or in combination with one or more of the first through sixth aspects, the supported channel latency indication includes at least one of power consumption information associated with the time domain equalization or computational resource information associated with the time domain equalization.

In an eighth aspect, alone or in combination with one or more of the first through seventh aspects, the supported channel latency indication is included in UE capability information.

In a ninth aspect, alone or in combination with one or more of the first through eighth aspects, process 600 includes receiving one or more downlink reference signals, the one or more downlink reference signals including a respective downlink reference signal associated with each of one or more component carriers, wherein transmitting the supported channel latency indication includes transmitting one or more reports associated with the one or more downlink reference signals, wherein the one or more reports include a respective supported channel latency indication for each of the one or more component carriers, and wherein the one or more reports further include a respective observed latency indication for each of the one or more component carriers.

In a tenth aspect, alone or in combination with one or more of the first through ninth aspects, the downlink communication is pre-equalized based at least in part on the supported channel latency indication.

In an eleventh aspect, alone or in combination with one or more of the first through tenth aspects, process 600 includes transmitting a post-equalization report based at least in part on receiving the downlink communication, wherein the post-equalization report includes an observed channel latency indication associated with the downlink communication.

In a twelfth aspect, alone or in combination with one or more of the first through eleventh aspects, the observed channel latency indication indicates a time gap between a first channel tap associated with the downlink communication that satisfies a threshold and a last channel tap associated with the downlink communication that satisfies the threshold.

In a thirteenth aspect, alone or in combination with one or more of the first through twelfth aspects, the observed channel latency indication indicates a first time gap between a first channel tap associated with the downlink communication that satisfies a first threshold and a strongest channel tap associated with the downlink communication, and a second supported time gap between the strongest channel tap associated with the downlink communication and a last channel tap associated with the downlink communication that satisfies a second threshold.

In a fourteenth aspect, alone or in combination with one or more of the first through thirteenth aspects, process 600 includes receiving, from the network node, an indication of a downlink bandwidth part that is based at least in part on the supported channel latency indication, wherein receiving the downlink communication includes receiving the downlink communication in the downlink bandwidth part that is based at least in part on the supported channel latency indication.

In a fifteenth aspect, alone or in combination with one or more of the first through fourteenth aspects, the downlink bandwidth part has a reduced bandwidth size part as compared with a previous downlink bandwidth part configured for the UE.

In a sixteenth aspect, alone or in combination with one or more of the first through fifteenth aspects, process 600 includes receiving, from the network node, an indication of one or more component carriers, wherein a quantity of the one or more component carriers is based at least in part on the supported channel latency indication, and wherein receiving the downlink communication includes receiving the downlink communication on a component carrier of the one or more component carriers.

In a seventeenth aspect, alone or in combination with one or more of the first through sixteenth aspects, the quantity of the one or more component carriers is reduced as compared with a previous quantity of component carriers configured for the UE.

In an eighteenth aspect, alone or in combination with one or more of the first through seventeenth aspects, process 600 includes receiving, from the network node, an indication of a selected component carrier based at least in part on the supported channel latency indication, wherein receiving the downlink communication includes receiving the downlink communication on the selected component carrier.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
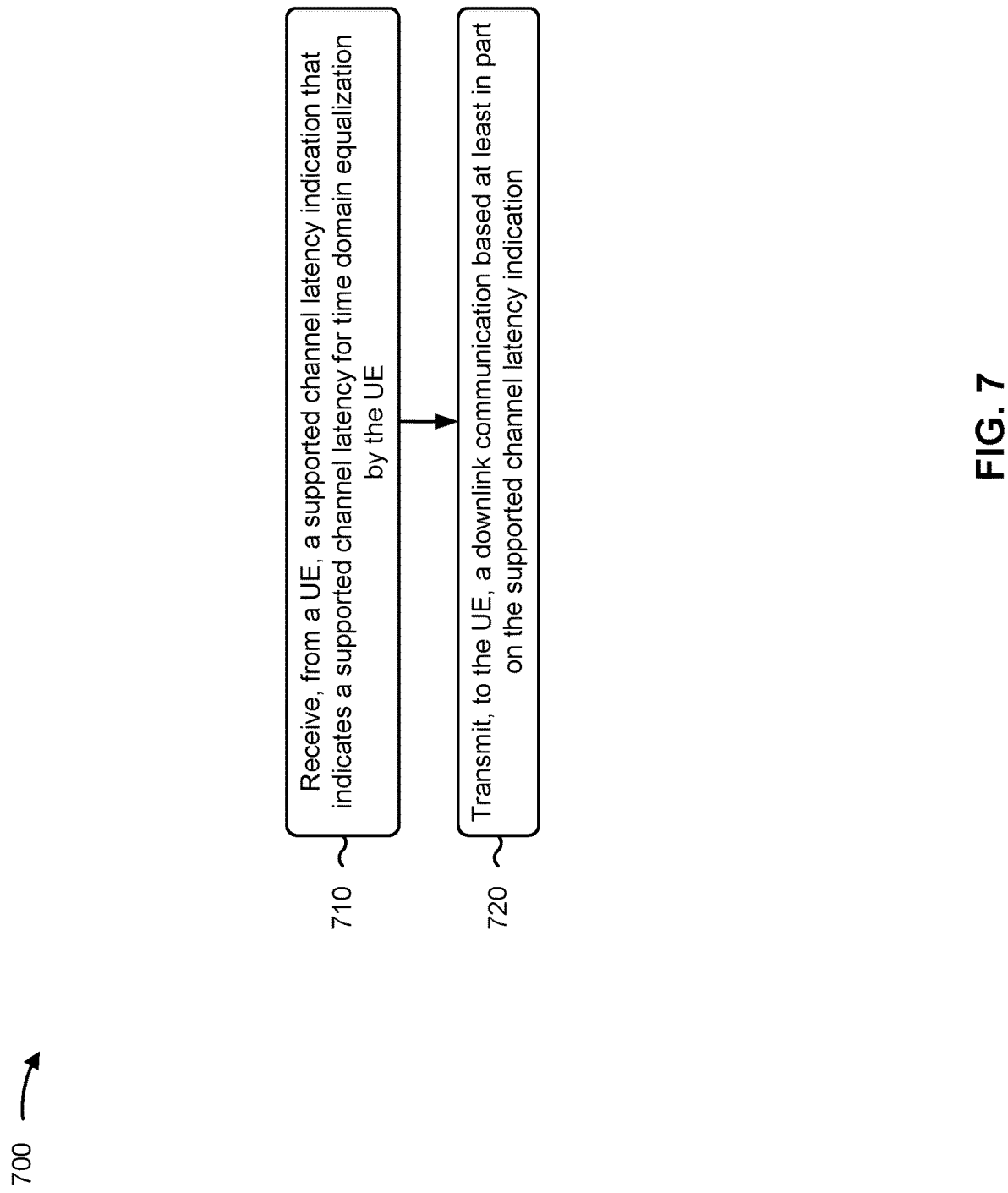
FIG. 7 is a diagram illustrating an example process performed, for example, at a network node or an apparatus of a network node, in accordance with the present disclosure.

FIG. 7 is a diagram illustrating an example process 700 performed, for example, at a network node or an apparatus of a network node, in accordance with the present disclosure. Example process 700 is an example where the apparatus or the network node (e.g., network node 110) performs operations associated with UE time domain equalization capability reporting.

As shown in FIG. 7, in some aspects, process 700 may include receiving, from a UE, a supported channel latency indication that indicates a supported channel latency for time domain equalization by the UE (block 710). For example, the network node (e.g., using reception component 902 and/or communication manager 906, depicted in FIG. 9) may receive, from a UE, a supported channel latency indication that indicates a supported channel latency for time domain equalization by the UE, as described above.

As further shown in FIG. 7, in some aspects, process 700 may include transmitting, to the UE, a downlink communication based at least in part on the supported channel latency indication (block 720). For example, the network node (e.g., using transmission component 904 and/or communication manager 906, depicted in FIG. 9) may transmit, to the UE, a downlink communication based at least in part on the supported channel latency indication, as described above.

Process 700 may include additional aspects, such as any single aspect or any combination of aspects described below and/or in connection with one or more other processes described elsewhere herein.

In a first aspect, the supported channel latency indication indicates a supported time gap between a first channel tap that satisfies a threshold and a last channel tap that satisfies the threshold.

In a second aspect, alone or in combination with the first aspect, process 700 includes transmitting, to the UE, signaling indicating the threshold, or receiving, from the UE, signaling indicating the threshold.

In a third aspect, alone or in combination with one or more of the first and second aspects, the supported channel latency indication indicates a first supported time gap between a first channel tap, prior to a strongest channel tap, that satisfies a first threshold and the strongest channel tap, and a second supported time gap between the strongest channel tap and a last channel tap, subsequent to the strongest channel tap, that satisfies a second threshold.

In a fourth aspect, alone or in combination with one or more of the first through third aspects, process 700 includes transmitting, to the UE, signaling indicating the first threshold and the second threshold, or receiving, from the UE, signaling indicating the first threshold and the second threshold.

In a fifth aspect, alone or in combination with one or more of the first through fourth aspects, the first supported time gap is associated with a feed forward filter associated with the time domain equalization and the second supported time gap is associated with a feedback filter associated with the time domain equalization.

In a sixth aspect, alone or in combination with one or more of the first through fifth aspects, the supported channel latency indication indicates a respective maximum supported channel latency for time domain equalization for each of one or more component carriers.

In a seventh aspect, alone or in combination with one or more of the first through sixth aspects, the supported channel latency indication includes at least one of power consumption information associated with the time domain equalization or computational resource information associated with the time domain equalization.

In an eighth aspect, alone or in combination with one or more of the first through seventh aspects, the supported channel latency indication is included in UE capability information.

In a ninth aspect, alone or in combination with one or more of the first through eighth aspects, process 700 includes transmitting one or more downlink reference signals, the one or more downlink reference signals including a respective downlink reference signal associated with each of one or more component carriers, wherein receiving the supported channel latency indication includes receiving one or more reports associated with the one or more downlink reference signals, wherein the one or more reports include a respective supported channel latency indication for each of the one or more component carriers, and wherein the one or more reports further include a respective observed latency indication for each of the one or more component carriers.

In a tenth aspect, alone or in combination with one or more of the first through ninth aspects, process 700 includes performing pre-equalization on the downlink communication based at least in part on the supported channel latency indication.

In an eleventh aspect, alone or in combination with one or more of the first through tenth aspects, process 700 includes receiving, from the UE, a post-equalization report based at least in part on the downlink communication, wherein the post-equalization report includes an observed channel latency indication associated with the downlink communication.

In a twelfth aspect, alone or in combination with one or more of the first through eleventh aspects, the observed channel latency indication indicates a time gap between a first channel tap associated with the downlink communication that satisfies a threshold and a last channel tap associated with the downlink communication that satisfies the threshold.

In a thirteenth aspect, alone or in combination with one or more of the first through twelfth aspects, the observed channel latency indication indicates a first time gap between a first channel tap associated with the downlink communication that satisfies a first threshold and a strongest channel tap associated with the downlink communication, and a second supported time gap between the strongest channel tap associated with the downlink communication and a last channel tap associated with the downlink communication that satisfies a second threshold.

In a fourteenth aspect, alone or in combination with one or more of the first through thirteenth aspects, process 700 includes transmitting, to the UE, an indication of a downlink bandwidth part that is based at least in part on the supported channel latency indication, wherein transmitting the downlink communication includes transmitting the downlink communication in the downlink bandwidth part that is based at least in part on the supported channel latency indication.

In a fifteenth aspect, alone or in combination with one or more of the first through fourteenth aspects, the downlink bandwidth part has a reduced bandwidth size part as compared with a previous downlink bandwidth part configured for the UE.

In a sixteenth aspect, alone or in combination with one or more of the first through fifteenth aspects, process 700 includes transmitting, to the UE, an indication of one or more component carriers, wherein a quantity of the one or more component carriers is based at least in part on the supported channel latency indication, and wherein transmitting the downlink communication includes transmitting the downlink communication on a component carrier of the one or more component carriers.

In a seventeenth aspect, alone or in combination with one or more of the first through sixteenth aspects, the quantity of the one or more component carriers is reduced as compared with a previous quantity of component carriers configured for the UE.

In an eighteenth aspect, alone or in combination with one or more of the first through seventeenth aspects, process 700 includes transmitting, to the UE, an indication of a selected component carrier based at least in part on the supported channel latency indication, wherein transmitting the downlink communication includes transmitting the downlink communication on the selected component carrier.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
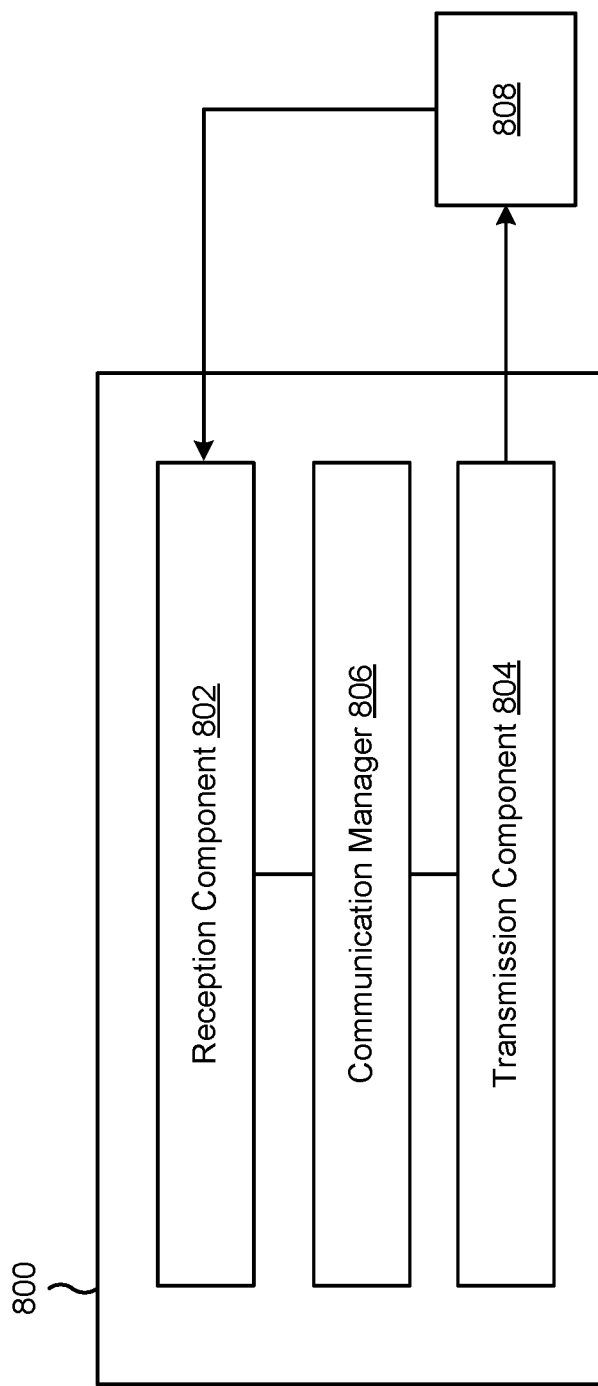
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 4 and 5A-5C. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The transmission component 804 may transmit, to a network node, a supported channel latency indication that indicates a supported channel latency for time domain equalization by the UE. The reception component 802 may receive, from the network node, a downlink communication based at least in part on the supported channel latency indication.

The reception component 802 may receive, from the network node, signaling indicating the threshold.

The transmission component 804 may transmit, to the network node, signaling indicating the threshold.

The reception component 802 may receive, from the network node, signaling indicating the first threshold and the second threshold.

The transmission component 804 may transmit, to the network node, signaling indicating the first threshold and the second threshold.

The reception component 802 may receive one or more downlink reference signals, the one or more downlink reference signals including a respective downlink reference signal associated with each of one or more component carriers, and the transmission component 804 may transmit one or more reports associated with the one or more downlink reference signals, wherein the one or more reports include a respective supported channel latency indication for each of the one or more component carriers, and wherein the one or more reports further include a respective observed latency indication for each of the one or more component carriers.

The transmission component 804 may transmit a post-equalization report based at least in part on receiving the downlink communication, wherein the post-equalization report includes an observed channel latency indication associated with the downlink communication.

The reception component 802 may receive, from the network node, an indication of a downlink bandwidth part that is based at least in part on the supported channel latency indication, and the reception component 802 may receive the downlink communication in the downlink bandwidth part that is based at least in part on the supported channel latency indication.

The reception component 802 may receive, from the network node, an indication of one or more component carriers, wherein a quantity of the one or more component carriers is based at least in part on the supported channel latency indication, and the reception component 802 may receive the downlink communication on a component carrier of the one or more component carriers.

The reception component 802 may receive, from the network node, an indication of a selected component carrier based at least in part on the supported channel latency indication, and the reception component 802 may receive the downlink communication on the selected component carrier.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
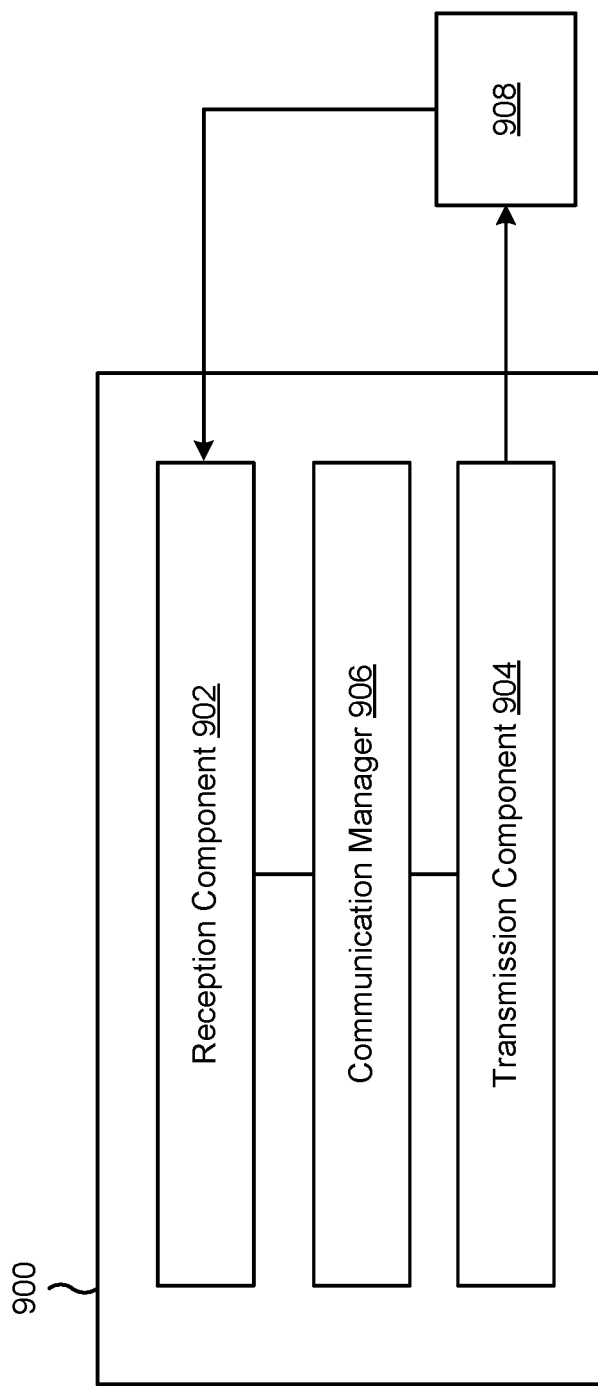
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4 and 5A-5C. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a UE, a supported channel latency indication that indicates a supported channel latency for time domain equalization by the UE. The transmission component 904 may transmit, to the UE, a downlink communication based at least in part on the supported channel latency indication.

The transmission component 904 may transmit, to the UE, signaling indicating the threshold.

The reception component 902 may receive, from the UE, signaling indicating the threshold.

The transmission component 904 may transmit, to the UE, signaling indicating the first threshold and the second threshold.

The reception component 902 may receive, from the UE, signaling indicating the first threshold and the second threshold.

The transmission component 904 may transmit one or more downlink reference signals, the one or more downlink reference signals including a respective downlink reference signal associated with each of one or more component carriers, and the reception component 902 may receive one or more reports associated with the one or more downlink reference signals, wherein the one or more reports include a respective supported channel latency indication for each of the one or more component carriers, and wherein the one or more reports further include a respective observed latency indication for each of the one or more component carriers.

The communication manager 906 may perform pre-equalization on the downlink communication based at least in part on the supported channel latency indication.

The reception component 902 may receive, from the UE, a post-equalization report based at least in part on the downlink communication, wherein the post-equalization report includes an observed channel latency indication associated with the downlink communication.

The transmission component 904 may transmit, to the UE, an indication of a downlink bandwidth part that is based at least in part on the supported channel latency indication, and the transmission component 904 may transmit the downlink communication in the downlink bandwidth part that is based at least in part on the supported channel latency indication.

The transmission component 904 may transmit, to the UE, an indication of one or more component carriers, wherein a quantity of the one or more component carriers is based at least in part on the supported channel latency indication, and the transmission component 904 may transmit the downlink communication on a component carrier of the one or more component carriers.

The transmission component 904 may transmit, to the UE, an indication of a selected component carrier based at least in part on the supported channel latency indication, and the transmission component 904 may transmit the downlink communication on the selected component carrier.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a network node, a supported channel latency indication that indicates a supported channel latency for time domain equalization by the UE; and receiving, from the network node, a downlink communication based at least in part on the supported channel latency indication.

Aspect 2: The method of Aspect 1, wherein the supported channel latency indication indicates a supported time gap between a first channel tap that satisfies a threshold and a last channel tap that satisfies the threshold.

Aspect 3: The method of Aspect 2, further comprising: receiving, from the network node, signaling indicating the threshold; or transmitting, to the network node, signaling indicating the threshold.

Aspect 4: The method of any of Aspects 1-3, wherein the supported channel latency indication indicates: a first supported time gap between a first channel tap, prior to a strongest channel tap, that satisfies a first threshold and the strongest channel tap, and a second supported time gap between the strongest channel tap and a last channel tap, subsequent to the strongest channel tap, that satisfies a second threshold.

Aspect 5: The method of Aspect 4, further comprising: receiving, from the network node, signaling indicating the first threshold and the second threshold; or transmitting, to the network node, signaling indicating the first threshold and the second threshold.

Aspect 6: The method of any of Aspects 4-5, wherein the first supported time gap is associated with a feed forward filter associated with the time domain equalization and the second supported time gap is associated with a feedback filter associated with the time domain equalization.

Aspect 7: The method of any of Aspects 1-6, wherein the supported channel latency indication indicates a respective maximum supported channel latency for time domain equalization for each of one or more component carriers.

Aspect 8: The method of any of Aspects 1-7, wherein the supported channel latency indication includes at least one of power consumption information associated with the time domain equalization or computational resource information associated with the time domain equalization.

Aspect 9: The method of any of Aspects 1-8, wherein the supported channel latency indication is included in UE capability information.

Aspect 10: The method of any of Aspects 1-9, further comprising receiving one or more downlink reference signals, the one or more downlink reference signals including a respective downlink reference signal associated with each of one or more component carriers, wherein transmitting the supported channel latency indication comprises: transmitting one or more reports associated with the one or more downlink reference signals, wherein the one or more reports include a respective supported channel latency indication for each of the one or more component carriers, and wherein the one or more reports further include a respective observed latency indication for each of the one or more component carriers.

Aspect 11: The method of any of Aspects 1-10, wherein the downlink communication is pre-equalized based at least in part on the supported channel latency indication.

Aspect 12: The method of Aspect 11, further comprising: transmitting a post-equalization report based at least in part on receiving the downlink communication, wherein the post-equalization report includes an observed channel latency indication associated with the downlink communication.

Aspect 13: The method of Aspect 12, wherein the observed channel latency indication indicates a time gap between a first channel tap associated with the downlink communication that satisfies a threshold and a last channel tap associated with the downlink communication that satisfies the threshold.

Aspect 14: The method of any of Aspects 12-13, wherein the observed channel latency indication indicates: a first time gap between a first channel tap associated with the downlink communication that satisfies a first threshold and a strongest channel tap associated with the downlink communication, and a second supported time gap between the strongest channel tap associated with the downlink communication and a last channel tap associated with the downlink communication that satisfies a second threshold.

Aspect 15: The method of any of Aspects 1-14, further comprising receiving, from the network node, an indication of a downlink bandwidth part that is based at least in part on the supported channel latency indication, wherein receiving the downlink communication comprises: receiving the downlink communication in the downlink bandwidth part that is based at least in part on the supported channel latency indication.

Aspect 16: The method of Aspect 15, wherein the downlink bandwidth part has a reduced bandwidth size part as compared with a previous downlink bandwidth part configured for the UE.

Aspect 17: The method of any of Aspects 1-16, further comprising receiving, from the network node, an indication of one or more component carriers, wherein a quantity of the one or more component carriers is based at least in part on the supported channel latency indication, and wherein receiving the downlink communication comprises: receiving the downlink communication on a component carrier of the one or more component carriers.

Aspect 18: The method of Aspect 17, wherein the quantity of the one or more component carriers is reduced as compared with a previous quantity of component carriers configured for the UE.

Aspect 19: The method of any of Aspects 1-18, further comprising receiving, from the network node, an indication of a selected component carrier based at least in part on the supported channel latency indication, wherein receiving the downlink communication comprises: receiving the downlink communication on the selected component carrier.

Aspect 20: A method of wireless communication performed by a network node, comprising: receiving, from a user equipment (UE), a supported channel latency indication that indicates a supported channel latency for time domain equalization by the UE; and transmitting, to the UE, a downlink communication based at least in part on the supported channel latency indication.

Aspect 21: The method of Aspect 20, wherein the supported channel latency indication indicates a supported time gap between a first channel tap that satisfies a threshold and a last channel tap that satisfies the threshold.

Aspect 22: The method of Aspect 21, further comprising: transmitting, to the UE, signaling indicating the threshold; or receiving, from the UE, signaling indicating the threshold.

Aspect 23: The method of any of Aspects 20-22, wherein the supported channel latency indication indicates: a first supported time gap between a first channel tap, prior to a strongest channel tap, that satisfies a first threshold and the strongest channel tap, and a second supported time gap between the strongest channel tap and a last channel tap, subsequent to the strongest channel tap, that satisfies a second threshold.

Aspect 24: The method of Aspect 23, further comprising: transmitting, to the UE, signaling indicating the first threshold and the second threshold; or receiving, from the UE, signaling indicating the first threshold and the second threshold.

Aspect 25: The method of any of Aspects 23-24, wherein the first supported time gap is associated with a feed forward filter associated with the time domain equalization and the second supported time gap is associated with a feedback filter associated with the time domain equalization.

Aspect 26: The method of any of Aspects 20-25, wherein the supported channel latency indication indicates a respective maximum supported channel latency for time domain equalization for each of one or more component carriers.

Aspect 27: The method of any of Aspects 20-26, wherein the supported channel latency indication includes at least one of power consumption information associated with the time domain equalization or computational resource information associated with the time domain equalization.

Aspect 28: The method of any of Aspects 20-27, wherein the supported channel latency indication is included in UE capability information.

Aspect 29: The method of any of Aspects 20-28, further comprising transmitting one or more downlink reference signals, the one or more downlink reference signals including a respective downlink reference signal associated with each of one or more component carriers, wherein receiving the supported channel latency indication comprises: receiving one or more reports associated with the one or more downlink reference signals, wherein the one or more reports include a respective supported channel latency indication for each of the one or more component carriers, and wherein the one or more reports further include a respective observed latency indication for each of the one or more component carriers.

Aspect 30: The method of any of Aspects 20-29, further comprising: performing pre-equalization on the downlink communication based at least in part on the supported channel latency indication.

Aspect 31: The method of Aspect 30, further comprising: receiving, from the UE, a post-equalization report based at least in part on the downlink communication, wherein the post-equalization report includes an observed channel latency indication associated with the downlink communication.

Aspect 32: The method of Aspect 31, wherein the observed channel latency indication indicates a time gap between a first channel tap associated with the downlink communication that satisfies a threshold and a last channel tap associated with the downlink communication that satisfies the threshold.

Aspect 33: The method of any of Aspects 31-32, wherein the observed channel latency indication indicates: a first time gap between a first channel tap associated with the downlink communication that satisfies a first threshold and a strongest channel tap associated with the downlink communication, and a second supported time gap between the strongest channel tap associated with the downlink communication and a last channel tap associated with the downlink communication that satisfies a second threshold.

Aspect 34: The method of any of Aspects 20-33, further comprising transmitting, to the UE, an indication of a downlink bandwidth part that is based at least in part on the supported channel latency indication, wherein transmitting the downlink communication comprises: transmitting the downlink communication in the downlink bandwidth part that is based at least in part on the supported channel latency indication.

Aspect 35: The method of Aspect 34, wherein the downlink bandwidth part has a reduced bandwidth size part as compared with a previous downlink bandwidth part configured for the UE.

Aspect 36: The method of any of Aspects 20-35, further comprising transmitting, to the UE, an indication of one or more component carriers, wherein a quantity of the one or more component carriers is based at least in part on the supported channel latency indication, and wherein transmitting the downlink communication comprises: transmitting the downlink communication on a component carrier of the one or more component carriers.

Aspect 37: The method of Aspect 36, wherein the quantity of the one or more component carriers is reduced as compared with a previous quantity of component carriers configured for the UE.

Aspect 38: The method of any of Aspects 20-37, further comprising transmitting, to the UE, an indication of a selected component carrier based at least in part on the supported channel latency indication, wherein transmitting the downlink communication comprises: transmitting the downlink communication on the selected component carrier.

Aspect 39: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-38.

Aspect 40: An apparatus for wireless communication at a device, the apparatus comprising one or more memories and one or more processors coupled to the one or more memories, the one or more processors configured to cause the device to perform the method of one or more of Aspects 1-38.

Aspect 41: An apparatus for wireless communication, the apparatus comprising at least one means for performing the method of one or more of Aspects 1-38.

Aspect 42: A non-transitory computer-readable medium storing code for wireless communication, the code comprising instructions executable by one or more processors to perform the method of one or more of Aspects 1-38.

Aspect 43: A non-transitory computer-readable medium storing a set of instructions for wireless communication, the set of instructions comprising one or more instructions that, when executed by one or more processors of a device, cause the device to perform the method of one or more of Aspects 1-38.

Aspect 44: A device for wireless communication, the device comprising a processing system that includes one or more processors and one or more memories coupled with the one or more processors, the processing system configured to cause the device to perform the method of one or more of Aspects 1-38.

Aspect 45: An apparatus for wireless communication at a device, the apparatus comprising one or more memories and one or more processors coupled to the one or more memories, the one or more processors individually or collectively configured to cause the device to perform the method of one or more of Aspects 1-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, which are configured, individually or in any combination, to:
transmit, to a network node, a supported channel latency indication that indicates a supported channel latency for time domain equalization by the UE; and
receive, from the network node, a downlink communication based at least in part on the supported channel latency indication.

2. The UE of claim 1, wherein the supported channel latency indication indicates a supported time gap between a first channel tap that satisfies a threshold and a last channel tap that satisfies the threshold.

3. The UE of claim 2, wherein the one or more processors are further configured, individually or in any combination, to:
receive, from the network node, signaling indicating the threshold; or
transmit, to the network node, signaling indicating the threshold.

4. The UE of claim 1, wherein the supported channel latency indication indicates:
a first supported time gap between a first channel tap, prior to a strongest channel tap, that satisfies a first threshold and the strongest channel tap, and
a second supported time gap between the strongest channel tap and a last channel tap, subsequent to the strongest channel tap, that satisfies a second threshold.

5. The UE of claim 4, wherein the one or more processors are further configured, individually or in any combination, to:
receive, from the network node, signaling indicating the first threshold and the second threshold; or
transmit, to the network node, signaling indicating the first threshold and the second threshold.

6. The UE of claim 4, wherein the first supported time gap is associated with a feed forward filter associated with the time domain equalization and the second supported time gap is associated with a feedback filter associated with the time domain equalization.

7. The UE of claim 1, wherein the supported channel latency indication indicates a respective maximum supported channel latency for time domain equalization for each of one or more component carriers.

8. The UE of claim 1, wherein the supported channel latency indication includes at least one of power consumption information associated with the time domain equalization or computational resource information associated with the time domain equalization.

9. The UE of claim 1, wherein the supported channel latency indication is included in UE capability information.

10. The UE of claim 1, wherein the one or more processors are further configured, individually or in any combination, to receive one or more downlink reference signals, the one or more downlink reference signals including a respective downlink reference signal associated with each of one or more component carriers, wherein the one or more processors, to transmit the supported channel latency indication, are configured, individually or in any combination, to:
transmit one or more reports associated with the one or more downlink reference signals, wherein the one or more reports include a respective supported channel latency indication for each of the one or more component carriers, and wherein the one or more reports further include a respective observed latency indication for each of the one or more component carriers.

11. The UE of claim 1, wherein the downlink communication is pre-equalized based at least in part on the supported channel latency indication.

12. The UE of claim 11, wherein the one or more processors are further configured, individually or in any combination, to:
 transmit a post-equalization report based at least in part on receiving the downlink communication, wherein the post-equalization report includes an observed channel latency indication associated with the downlink communication.

13. The UE of claim 12, wherein the observed channel latency indication indicates a time gap between a first channel tap associated with the downlink communication that satisfies a threshold and a last channel tap associated with the downlink communication that satisfies the threshold.

14. The UE of claim 12, wherein the observed channel latency indication indicates:
 a first time gap between a first channel tap associated with the downlink communication that satisfies a first threshold and a strongest channel tap associated with the downlink communication, and
 a second supported time gap between the strongest channel tap associated with the downlink communication and a last channel tap associated with the downlink communication that satisfies a second threshold.

15. The UE of claim 1, wherein the one or more processors are further configured, individually or in any combination, to receive, from the network node, an indication of a downlink bandwidth part that is based at least in part on the supported channel latency indication, wherein the one or more processors, to receive the downlink communication, are configured, individually or in any combination, to:
 receive the downlink communication in the downlink bandwidth part that is based at least in part on the supported channel latency indication.

16. The UE of claim 15, wherein the downlink bandwidth part has a reduced bandwidth size part as compared with a previous downlink bandwidth part configured for the UE.

17. The UE of claim 1, wherein the one or more processors are further configured, individually or in any combination, to receive, from the network node, an indication of one or more component carriers, wherein a quantity of the one or more component carriers is based at least in part on the supported channel latency indication, and wherein the one or more processors, to receive the downlink communication, are configured, individually or in any combination, to:
 receive the downlink communication on a component carrier of the one or more component carriers.

18. The UE of claim 17, wherein the quantity of the one or more component carriers is reduced as compared with a previous quantity of component carriers configured for the UE.

19. The UE of claim 1, wherein the one or more processors are further configured, individually or in any combination, to receive, from the network node, an indication of a selected component carrier based at least in part on the supported channel latency indication, wherein the one or more processors, to receive the downlink communication, are configured, individually or in any combination, to:
 receive the downlink communication on the selected component carrier.

20. A network node for wireless communication, comprising:
 one or more memories; and
 one or more processors, coupled to the one or more memories, which are configured, individually or in any combination, to:
  receive, from a user equipment (UE), a supported channel latency indication that indicates a supported channel latency for time domain equalization by the UE; and
  transmit, to the UE, a downlink communication based at least in part on the supported channel latency indication.

21. The network node of claim 20, wherein the supported channel latency indication indicates a supported time gap between a first channel tap that satisfies a threshold and a last channel tap that satisfies the threshold.

22. The network node of claim 20, wherein the supported channel latency indication indicates:
 a first supported time gap between a first channel tap, prior to a strongest channel tap, that satisfies a first threshold and the strongest channel tap, and
 a second supported time gap between the strongest channel tap and a last channel tap, subsequent to the strongest channel tap, that satisfies a second threshold.

23. The network node of claim 20, wherein the supported channel latency indication indicates a respective maximum supported channel latency for time domain equalization for each of one or more component carriers.

24. The network node of claim 20, wherein the one or more processors are further configured, individually or in any combination, to:
 perform pre-equalization on the downlink communication based at least in part on the supported channel latency indication.

25. The network node of claim 24, wherein the one or more processors are further configured, individually or in any combination, to:
 receive, from the UE, a post-equalization report based at least in part on the downlink communication, wherein the post-equalization report includes an observed channel latency indication associated with the downlink communication.

26. The network node of claim 20, wherein the one or more processors are further configured, individually or in any combination, to transmit, to the UE, an indication of a downlink bandwidth part that is based at least in part on the supported channel latency indication, wherein the one or more processors, to transmit the downlink communication, are configured, individually or in any combination, to:
 transmit the downlink communication in the downlink bandwidth part that is based at least in part on the supported channel latency indication.

27. The network node of claim 20, wherein the one or more processors are further configured, individually or in any combination, to transmit, to the UE, an indication of one or more component carriers, wherein a quantity of the one or more component carriers is based at least in part on the supported channel latency indication, and wherein the one or more processors, to transmit the downlink communication, are configured, individually or in any combination, to:
 transmit the downlink communication on a component carrier of the one or more component carriers.

28. The network node of claim 20, wherein the one or more processors are further configured, individually or in any combination, to transmit, to the UE, an indication of a selected component carrier based at least in part on the supported channel latency indication, wherein the one or more processors, to transmit the downlink communication, are configured, individually or in any combination, to:

transmit the downlink communication on the selected component carrier.

29. A method of wireless communication performed by a user equipment (UE), comprising:
transmitting, to a network node, a supported channel latency indication that indicates a supported channel latency for time domain equalization by the UE; and
receiving, from the network node, a downlink communication based at least in part on the supported channel latency indication.

30. A method of wireless communication performed by a network node, comprising:
receiving, from a user equipment (UE), a supported channel latency indication that indicates a supported channel latency for time domain equalization by the UE; and
transmitting, to the UE, a downlink communication based at least in part on the supported channel latency indication.

* * * * *